US008212808B2

(12) United States Patent
Shimizu

(10) Patent No.: US 8,212,808 B2
(45) Date of Patent: Jul. 3, 2012

(54) IMAGE PROCESSING PROGRAM AND IMAGE PROCESSING APPARATUS

(75) Inventor: Hideaki Shimizu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1268 days.

(21) Appl. No.: 11/898,108

(22) Filed: Sep. 10, 2007

(65) Prior Publication Data

US 2009/0015584 A1 Jan. 15, 2009

(30) Foreign Application Priority Data

Jul. 9, 2007 (JP) ................................. 2007-180293

(51) Int. Cl.
*G06T 15/00* (2006.01)
(52) U.S. Cl. .................. 345/419; 345/581; 345/473
(58) Field of Classification Search .................. None
See application file for complete search history.

(56) References Cited

FOREIGN PATENT DOCUMENTS
JP 2006-285510 10/2006

OTHER PUBLICATIONS

P. Decaudin and F. Neyret, "Rendering Forest Scenes in Real-Time", 2004, Eurographics Association, Euographics Symposium on Rendering.*
K. Onoue, T. Nishita, "An Interactive Deformation System for Granular Material", Mar. 2005, Eurographics Association, Computer Graphics Forum, vol. 24, Issue 1, pp. 51-60.*
A. Meyer, F. Neyret, "Interactive Volumetric Textures", Jul. 1998, Euographics Association, Eurographics Rendering Workshop 1998, pp. 157-168.*
A. Struyk, W. Lalonde, "Real Time Simulation of Snowfall—A Particle Based Approach", Apr. 6, 2004, Carleton Univsersity Honors Project.*
R. W. Sumner, J. F. O'Brien, J. K. Hodgins, "Animating Sand, Mud, and Snow", 1999, Eurographics Association, Computer Graphics Forum, vol. 18, No. 1, pp. 17-26.*
B. Benes, R. Forsbach, "Layered Data Representation for Visual Simulation of Terrain Erosion", Apr. 28 2001, IEEE, Spring Conference on Computer Graphics, pp. 80-85.*
Fabrice Neyret, "Modeling Animating and Rendering Complex Scenes Using Volumetric Textures", Mar. 1998, IEEE, IEEE Transactions on Visualization and Computer Graphics 4(1).*
Neyret, Fabrice, Synthesizing Verdant Landscapes Using Volumetric Textures, INRIA Rocquencourt, Rapport de recherche No. 28846, Mar. 1996, 12 pages.

* cited by examiner

*Primary Examiner* — Ulka Chauhan
*Assistant Examiner* — Robert Bader
(74) *Attorney, Agent, or Firm* — Nixon & Vanderhye P.C.

(57) ABSTRACT

Multilayer polygon data for constructing multilayer polygonal models and a height map including height data values, arranged in a two-dimensional array, each of which indicates the height of each position provided on a three-dimensional object to be drawn, are read from a storage device. Then, the height of a layer of the multilayer polygonal models is compared to the height data value of a position provided on the height map, so as to determine a visible region provided on the layer of the multilayer polygonal models. And then, the visible region which is determined as described above and provided on the layer of the multilayer polygonal models is drawn in a predetermined color. Thus, it is possible to easily draw, in three-dimensional image processing, a three-dimensional object, such as an accumulation of snow, soil, sand, or bricks, positioned in the virtual space, regardless of the shape of the object.

28 Claims, 24 Drawing Sheets

MULTILAYER SHELL MODELS (1ST - 4TH LAYERS)

BASE MODEL

MAPPING

1ST-LAYER SHELL MODEL
(HEIGHT=1)

▨ VISIBLE REGION
▱ INVISIBLE REGION

4TH-LAYER SHELL MODEL
(HEIGHT=4)

▨ VISIBLE REGION
▱ INVISIBLE REGION

IMAGE PROCESSING PROGRAM AND IMAGE PROCESSING APPARATUS

CROSS REFERENCE TO RELATED APPLICATION

The disclosure of Japanese Patent Application No. 2007-180293, filed on Jul. 9, 2007, is incorporated herein by reference.

FIELD

The technology herein relates to an image processing program and an image processing apparatus, and particularly to an image processing program and an image processing apparatus, which are used for drawing the surface shape of a three-dimensional object, such as an accumulation of snow, soil, sand, or bricks, positioned in a virtual space.

BACKGROUND AND SUMMARY

Conventionally, in order to represent an accumulation of snow in three-dimensional image processing, a method is employed for positioning, in a virtual space, a polygonal model in shape corresponding to the shape of the snow surface of the accumulation of snow (see Japanese Laid-Open Patent Publication No. 2006-285510, for example).

However, in order to position, in the virtual space, the polygonal model in shape corresponding to the shape of the snow surface of the accumulation of snow as described above, the more complex the shape of the snow surface is, the more complex the shape of the polygonal model also is. As a result, the number of polygons included in the polygonal model is extremely large, and therefore increases the processing load of the computer.

Therefore, certain example embodiments provide an image processing program and an image processing apparatus, which are capable of easily drawing, in three-dimensional image processing, the surface shape of a three-dimensional object, such as an accumulation of snow, soil, sand, or bricks, positioned in a virtual space, regardless of the shape of the object.

The reference numerals and the figure numbers in parentheses recited below indicate an example of the correspondence with the drawings in order to aid in understanding certain example embodiments and are not intended to limit the scope of the present invention in any way.

In certain example embodiments a computer-readable storage medium having stored therein an image processing program (40) for drawing a three-dimensional object (e.g., an accumulation of snow, soil, sand, or bricks) positioned in a virtual space is provided. The image processing program is a computer program for causing a computer (10, 11b) to execute a polygon data reading step, a height map reading step, a visible region determining step (S46), and a drawing step (S48). The polygon data reading step is a step of reading, from storage means (11e, 12), multilayer polygon data (43) for constructing multilayer polygonal models including a plurality of polygonal models positioned in layers. The height map reading step is a step of reading, from the storage means (11e, 12), a height map (30) including height data values arranged in a two-dimensional array, the height data values each indicating a height of each position which is provided on the three-dimensional object to be drawn and corresponds to each position provided on the multilayer polygonal models. The visible region determining step is a step of determining, by comparing a height of a layer of the multilayer polygonal models to the height data value of a position provided on the height map, whether a position provided on the layer corresponding to the position provided on the height map is to be displayed in a visible manner. The drawing step is a step of, based on a determination made in the visible region determining step that a region is to be displayed in a visible manner, drawing the region in a predetermined color.

Note that the image processing program may further cause the computer to execute a height changing step (S16, S18, S20) of changing the height data values of at least a portion of positions provided on the height map. Thus, it is possible to change the height of the three-dimensional object to be drawn.

Further, the image processing program may further cause the computer to execute a moving object positioning step (S10) of positioning, in the virtual space, a moving object (31) which is an object different from the three-dimensional object, and to execute a movement control step of moving the moving object. The height changing step may include an object interfering step (S16) of changing the height data value of a position (Pc) which is provided on the height map and corresponds to a current position of the moving object. Thus, it is possible to change the height of a position (or a region) provided on the three-dimensional object and corresponding to the current position of the moving object.

Further, the object interfering step may include: a step (S12) of obtaining a position which is provided on the multilayer polygonal models and corresponds to the current position of the moving object; a step (S14) of obtaining, based on mapping information (FIG. 16) indicating which position provided on the multilayer polygonal models corresponds to which position provided on the height map, a position which is provided on the height map and corresponds to the position provided on the multilayer polygonal models; and a step (S16) of changing the height data value of the position provided on the height map.

Further, the object interfering step may include a circular region decreasing step (S16) of decreasing the height date values within a circular region having a predetermined radius and having its center at the position (Pc) which is provided on the height map and corresponds to the current position of the moving object (FIG. 17).

Further, the object interfering step may further include an outer region increasing step (S18) of increasing the height data values of a predetermined region outside the circular region in accordance with a decreasing amount of the height data values which is obtained in the circular region decreasing step (FIG. 20).

Further, the image processing program may further cause the computer to execute an operation data acquisition step of acquiring operation data from an input device (7). And the movement control step may include an object operation step of moving the moving object based on the operation data.

Further, the height changing step may include a random increasing step (S20) of randomly selecting a position provided on the height map and of increasing the height data value of the position (FIG. 15).

Further, the image processing program may cause the computer, based on the determination made in the visible region determining step that the region is to be displayed in a visible manner, to draw the region provided on the multilayer polygonal models by using a color and transparency set in advance with respect to each layer, in the drawing step.

Further, the image processing program may further cause the computer to execute a texture image reading step of reading a texture image from the storage means. And the drawing step may further include a texture image mapping step of mapping, with the texture image, the region based on the determination made in the visible region determining step that the region is to be displayed in a visible manner, so as to draw the region.

Further, the image processing program may further cause the computer to execute a step of reading, from the storage means (11e, 12), base model data (41) for constructing a base model which is a polygonal model based on which the multilayer polygonal models are constructed, and to execute a multilayer model generating step of generating the multilayer polygon data based on the read base model data.

Further, the image processing program may further cause the computer to execute a base model mapping step of texture-mapping the base model with a texture image (42) prepared for the base model.

Further, the image processing program may further cause the computer to execute a layer number changing step of changing the number of layers to be generated in the multilayer model generating step.

Further, the multilayer polygon data read in the polygon data reading step may be polygon data prepared in advance.

Further, the image processing program may further cause the computer, in a separate manner form the multilayer polygonal models constructed based on the multilayer polygon data read in the polygon data reading step, to execute a step of reading, from the storage means (11e, 12), base model data (41) for constructing a base model which is a polygonal model based on which the multilayer polygonal models are constructed, and to execute a base model mapping step of texture-mapping, with a texture image prepared for the base model, the base model constructed based on the read base model data.

An image processing apparatus according to certain example embodiments is an image processing apparatus (3) for drawing a three-dimensional object (e.g., an accumulation of snow, soil, sand, or bricks) positioned in a virtual space, and includes polygon data reading means (10, 11b), height map reading means (10, 11b), visible region determining means (10, 11b), and drawing means (10, 11b). The polygon data reading means is means for reading, from storage means (11e, 12), multilayer polygon data (43) for constructing multilayer polygonal models including a plurality of polygonal models positioned in layers. The height map reading means is means for reading, from the storage means (11e, 12), a height map (30) including height data values arranged in a two-dimensional array, the height data values each indicating a height of each position which is provided on the three-dimensional object to be drawn and corresponds to each position provided on the multilayer polygonal models. The visible region determining means is means for determining, by comparing a height of a layer of the multilayer polygonal models to the height data value of a position (texel) provided on the height map, whether a position provided on the layer and corresponding to the position provided on the height map is to be displayed in a visible manner. The drawing means is means for, based on a determination made by the visible region determining means that a region is to be displayed in a visible manner, drawing the region in a predetermined color.

Further, the image processing apparatus may further include height changing means (10, 11b) for changing the height data values of at least a portion of positions provided on the height map.

Further, the image processing apparatus may further include moving object positioning means (10, 11b) for positioning, in the virtual space, a moving object (31) which is an object different from the three-dimensional object, and also include movement control means (10, 11b) for moving the moving object. And the height changing means may include object interfering means for changing the height data value of a position (Pc) which is provided on the height map and corresponds to a current position of the moving object.

In certain example embodiments, in three-dimensional image processing, it is possible to draw a three-dimensional object, such as an accumulation of snow, soil, sand, or bricks, positioned in a virtual space, using the small number of polygons even when the three-dimensional object is complex-shaped, by displaying the object in a simulated manner by multilayer polygonal models, without preparing a polygonal model in shape corresponding to the shape of the object.

These and other objects, features, aspects and advantages of certain example embodiments will become more apparent from the following detailed description when taken in conjunction with the accompanying drawings.

DETAILED DESCRIPTION (Overall Structure of the Game System)

Figure 1:
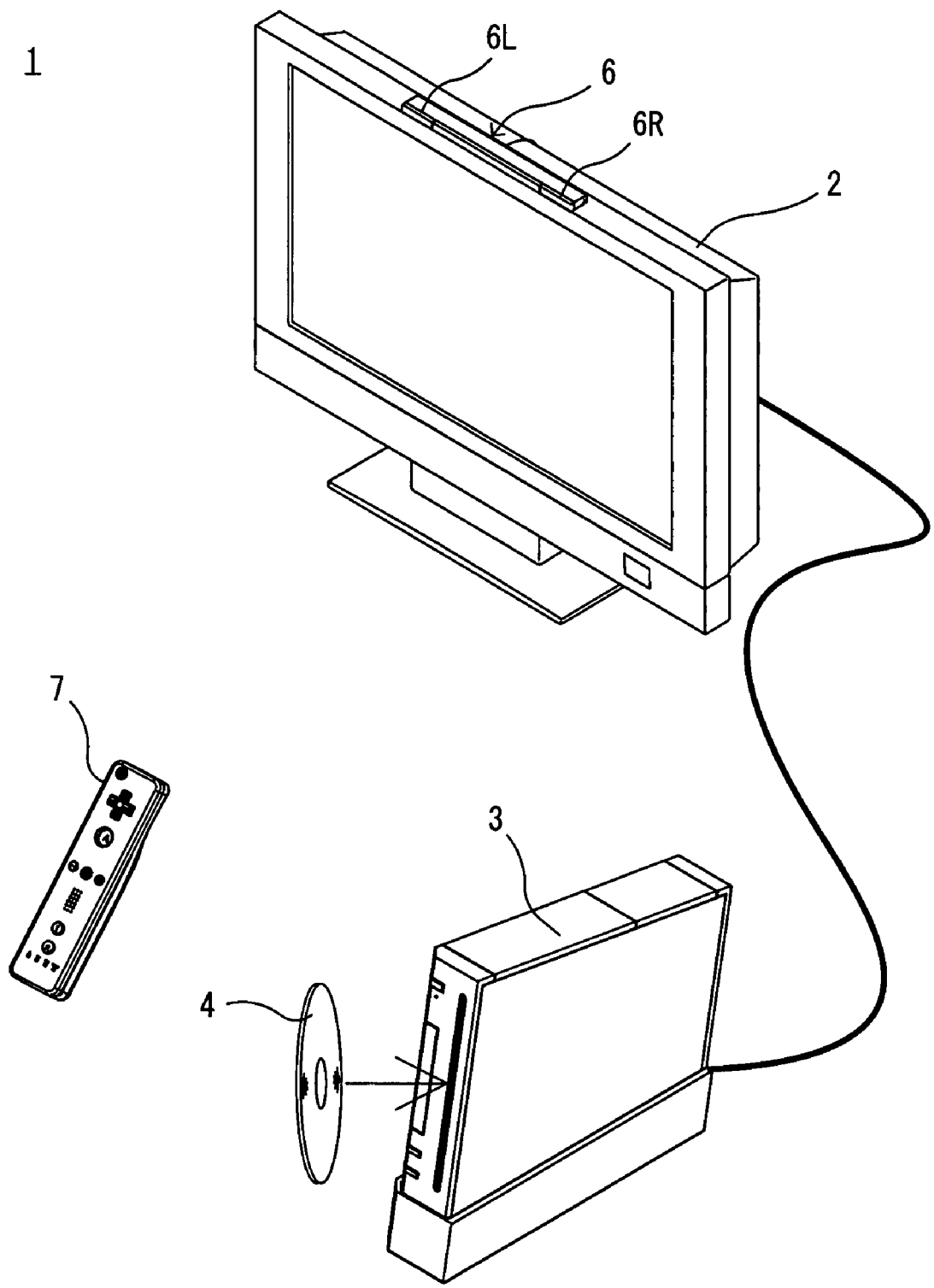
FIG. 1 is an external view of a game system 1 according to an embodiment.

With reference to FIG. 1, a game system 1 including a game apparatus according to an embodiment will be described. FIG. 1 is an external view of the game system 1. Hereinafter, a game apparatus and a game program according to the present embodiment will be described. In the following example, the game apparatus is a stationary game apparatus. As shown in FIG. 1, the game system 1 includes a TV receiver (hereinafter referred to simply as a "TV") 2, a game apparatus 3, an optical disc 4, a marker section 6, and a controller 7. In the game system 1, game processing is executed by the game apparatus 3 based on a game operation performed using the controller 7.

In the game apparatus 3, the optical disc 4 is detachably mountable as an exemplary information storage medium exchangeably usable for the game apparatus 3. The optical disc 4 has stored therein the game program to be executed by the game apparatus 3. The game apparatus 3 has an insertion opening on the front surface thereof for mounting the optical disc 4. The game apparatus 3 reads and executes the game program stored in the optical disc 4 inserted into the insertion opening, and thus performs the game processing.

The game apparatus 3 is connected to the TV 2 as an exemplary display device via a connection cord. The TV 2 displays a game image obtained as a result of the game processing executed by the game apparatus 3. Further, the marker section 6 is provided in the vicinity of a display screen of the TV 2 (above the display screen in FIG. 1). The marker section 6 includes two markers 6R and 6L respectively at two ends thereof. Specifically, the marker 6R (also the marker 6L) includes one or more infrared LEDs, and outputs infrared light forward from the TV 2. The marker section 6 is connected to the game apparatus 3, and the game apparatus 3 can control each of the infrared LEDs included in the marker section 6 to be lit up or out.

The controller 7 is an input device for providing the game apparatus 3 with operation data representing the particulars of the operation made thereon. The controller 7 and the game apparatus 3 are connected to each other via wireless communications. In the present embodiment, the controller 7 and the game apparatus 3 wirelessly communicate with each other by, for example, the Bluetooth (register trademark) technology. Note that in another embodiment, the controller 7 and the game apparatus 3 may be connected to each other in a wired manner.

(Internal Structure of the Game Apparatus 3)

Figure 2:
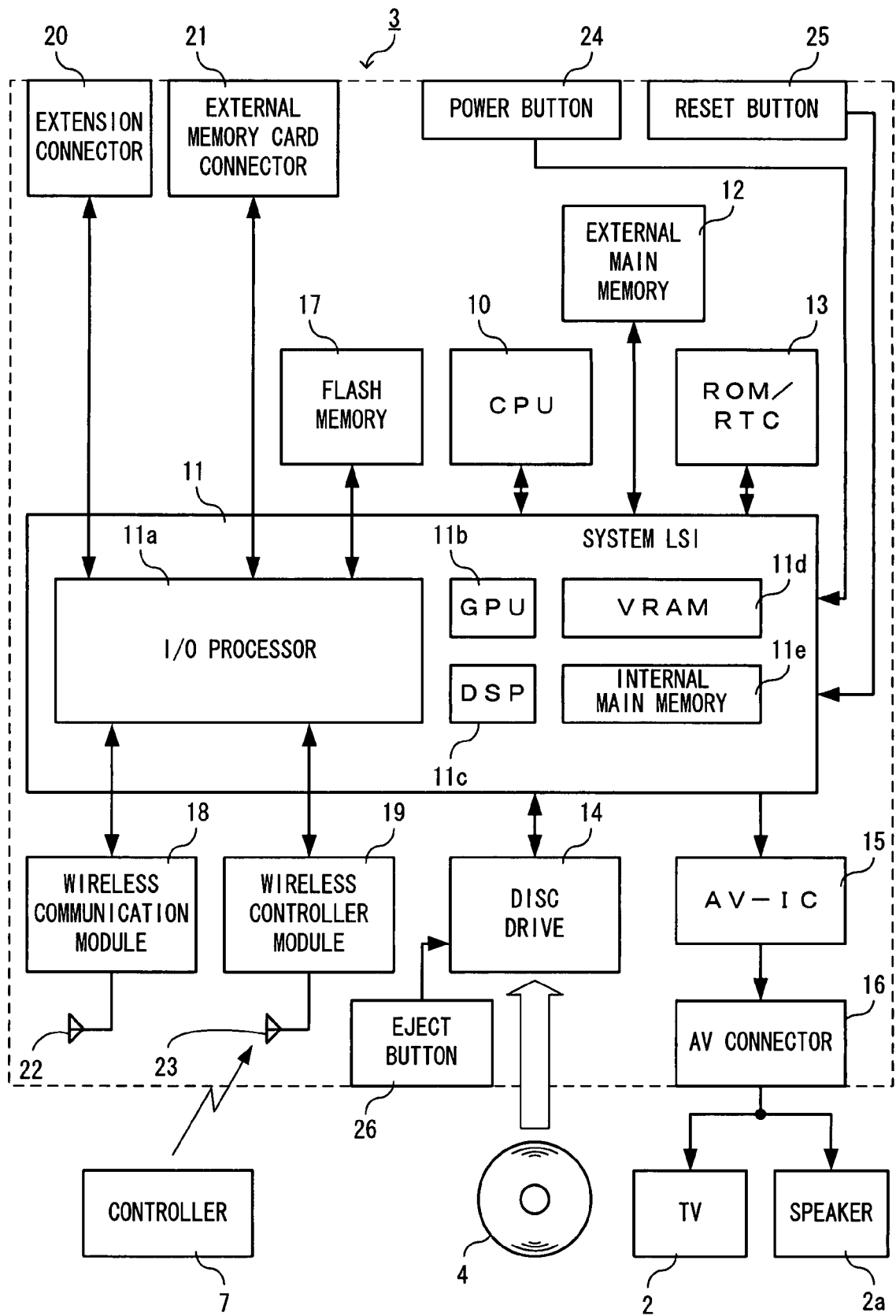
FIG. 2 is a block diagram showing a structure of a game apparatus 3.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing the game program stored in the optical disc 4, and acts as a game processor. The CPU 10 is connected to the system LSI 11. The system LSI 11 is connected to the CPU 10 and also to the external main memory 12, the ROM/RTC 13, the disc drive 14, and the AV-IC 15. The system LSI 11, for example, controls data transfer between the elements connected thereto, generates images to be displayed, and obtains data from external devices. An internal structure of the system LSI 11 will be described below. The external main memory 12, which is of a volatile type, stores therein programs including the game program read from the optical disc 4, the game program read from a flash memory 17, or various other data. The external main memory 12 is used as a work area or a buffer area of the CPU 10. The ROM/RTC 13 includes a ROM (a so-called boot ROM) having a program for starting the game apparatus 3 incorporated therein and a clock circuit (RTC: Real Time Clock) for counting time. The disc drive 14 reads program data, texture data or the like from the optical disc 4 and writes the read data into an internal main memory 11e described below or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected to one another via an internal bus.

The GPU 11b is a part of drawing means and generates an image in accordance with a graphics command (a command to draw an image) from the CPU 10. The VRAM 11d stores data (polygon data, texture data, etc.) necessary for the GPU 11b to execute the graphics command. The GPU 11b uses the data stored in the VRAM 11d to generate image data.

The DSP 11c acts as an audio processor and generates audio data using sound data or sound wave (sound tone) data stored in the internal main memory 11e or the external main memory 12.

The image data and the audio data generated as described above are read by the AV-IC 15. The AV-IC 15 outputs the read image data to the TV 2 via an AV connector 16, and also outputs the read audio data to a speaker 2a built in the TV 2. Thus, the image is displayed on the TV 2 and also the sound is outputted from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an expansion connector 20, and an external memory card connector 21. The wireless communication module 18 is connected to an antenna 22, and the wireless controller module 19 is connected to an antenna 23.

The input/output processor 11a is connected to a network via the wireless communication module 18 and the antenna 22, and thus can communicate with other game apparatuses or various servers also connected to the network. The input/output processor 11a periodically accesses the flash memory 17, and detects the presence or absence of data required to be transmitted to the network. When the data is present, the input/output processor 11a transmits the data to the network via the wireless communication module 18 and the antenna 22. The input/output processor 11a also receives, via the network, the antenna 22, and the wireless communication module 18, data transmitted from other game apparatuses or data downloaded from a download server, and stores the received data in the flash memory 17. The CPU 10 executes the game program and thus reads the data stored in the flash memory 17 to be used for the game program. The flash memory 17 may have stored therein data (data after or in the middle of the game) saved as a result of playing the game using the game apparatus 3 as well as the data to be transmitted to, or the data received from, the other game apparatuses or various servers.

Further, the input/output processor 11a receives, via the antenna 23 and the wireless controller module 19, operation data transmitted from the controller 7, and stores (temporarily stores) the operation data in a buffer area of the internal main memory 11e or the external main memory 12.

Furthermore, the input/output processor 11a is connected to the expansion connector 20 and the external memory card connector 21. The expansion connector 20 is a connector for an interface such as USB or SCSI. The expansion connector 20 may be connected to a medium such as an external storage medium, may be connected to a peripheral device such as another controller, or may be connected to a wired communication connector, so as to communicate with the network instead of the wireless communication module 18. The external memory card connector 21 is a connector for an external storage medium such as a memory card. For example, the input/output processor 11a can access an external storage medium via the expansion connector 20 or the external memory card connector 21 so as to store or read data.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

Figure 3:
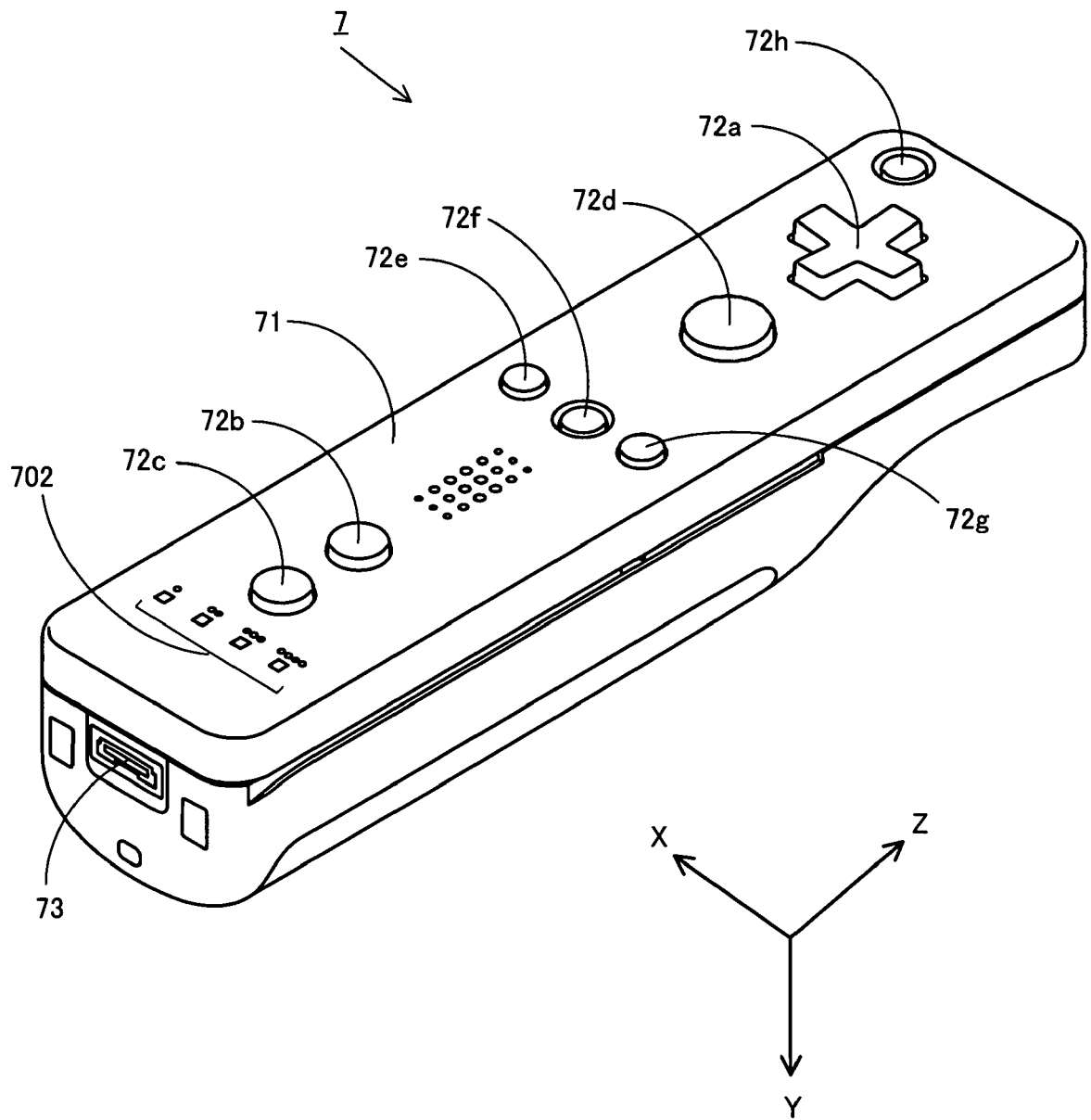
FIG. 3 is a perspective view showing a controller 7 as viewed from the top rear side thereof.
Figure 4:
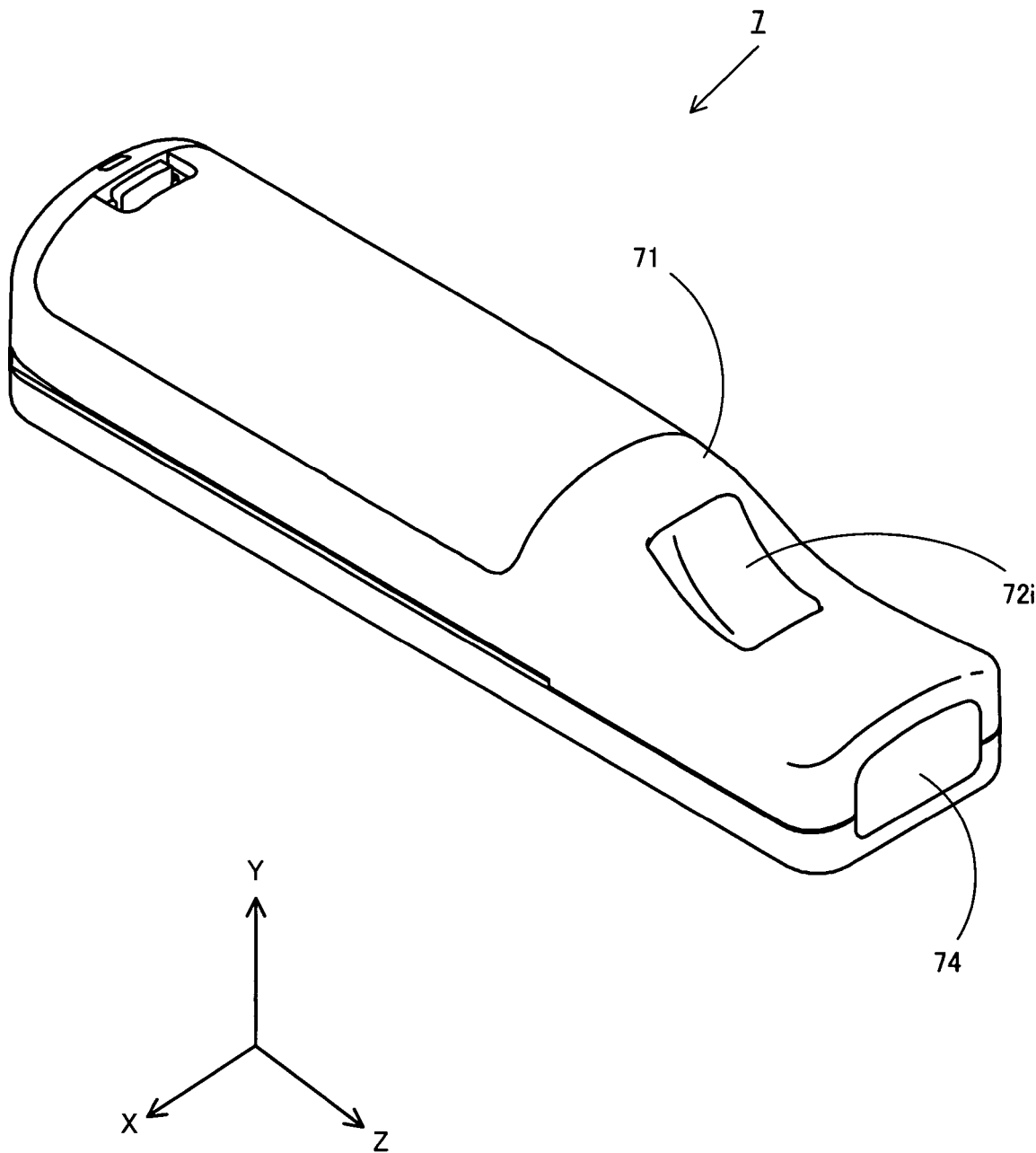
FIG. 4 is a perspective view showing the controller 7 as viewed from the bottom front side thereof.

With reference to FIGS. 3 and 4, the controller 7 will be described. Note that FIG. 3 is a perspective view showing the controller 7 as viewed from the top rear side thereof. FIG. 4 is a perspective view showing the controller 7 as viewed from the bottom front side thereof.

As shown in FIGS. 3 and 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of the front part of the top surface of the housing 71, a cross key 72a is provided. The cross key 72a is a cross-shaped four-direction push switch. The cross key 72a includes operation portions corresponding to the four directions (front, rear, right and left), which are respectively located on cross-shaped projecting portions arranged at 90 degree intervals. The player selects one of the front, rear, right, and left directions by pressing one of the operation portions of the cross key 72a. Through an operation on the cross key 72a, the player can, for example, instruct a direction in which a player character or the like appearing in a virtual game world is to move, or select one of a plurality of options.

Note that although the cross key 72a is an operation section for outputting an operation signal in accordance with the above-described direction input operation performed by the player, such an operation section may be provided in another form. For example, the cross key 72a may be replaced with an operation section which has four push switches extending in four directions, respectively, so as to form a cross and outputs an operation signal in accordance with the player pressing one of the push switches. Further, the cross key 72a may be replaced with an operation section which has the four push switches in combination with a center switch positioned at the center of the cross of the four push switches. Alternatively, the cross key 72a may be replaced with an operation section which includes an inclinable stick (a so-called joy stick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f, and 72g are provided. The operation buttons 72b, 72c, 72d, 72e, 72f, and 72g are operation sections for outputting, when the player presses the heads thereof, operation signals assigned to the operation buttons 72b, 72c, 72d, 72e, 72f, or 72g, respectively. For example, the operation buttons 72b, 72c, and 72d are assigned with functions of a first button, a second button, and an A button, respectively. Further, for example, the operation buttons 72e, 72f, and 72g are assigned with functions of a minus button, a home button, and a plus button, respectively. The operation buttons 72a, 72b, 72c, 72d, 72e, 72f, and 72g are assigned with various operation functions in accordance with the game program executed by the game apparatus 3. Note that in an exemplary arrangement shown in FIG. 3, the operation buttons 72b, 72c, and 72d are arranged in a line at the center on the top surface of the housing 71 in the front-rear direction. Further, the operation buttons 72e, 72f, and 72g are arranged in a line in the left-right direction between the operation buttons 72b and 72d on the top surface of the housing 71. The operation button 72f has the top surface thereof buried in the top surface of the housing 71, so as not to be inadvertently pressed by the player.

Further, in front of the cross key 72a on the top surface of the housing 71, an operation button 72h is provided. The operation button 72h is a power switch for remote-controlling the power of the game apparatus 3 to be on/off. The operation button 72h also has the top surface thereof buried in the top surface of the housing 71, so as not to be inadvertently pressed by the player.

Further, behind the operation button 72c on the top surface of the housing 71, a plurality of LEDs 702 are provided. The controller 7 is assigned with a controller type (number) so as to be distinguishable from the other controllers 7. For example, the LEDs 702 are used for informing the player of the controller type currently set to controller 7 that he or she is using. Specifically, when transmission data is transmitted from the controller 7 to the wireless controller module 19, one LED among the plurality of LEDs 702 which corresponds to the controller type is lit up.

Further, on the top surface of the housing 71, a second hole for outputting, to the outside, a sound from a speaker (a speaker 706 shown in FIG. 5) described below is provided between the operation button 72b and the operation buttons 72e, 72f and 72g.

On the other hand, on the bottom surface of the housing 71, a recessed portion is formed. The recessed portion is formed at a position at which an index finger or a middle finger of the player is to be located when the player holds the controller 7 by one hand so as to orient the front surface of the controller 7 toward the markers 6L and 6R. On a slope surface (on the rear surface side) of the recessed portion, an operation button 72i is provided. The operation button 72i is an operation section acting as, for example, a B button.

Further, on the front surface of the housing 71, an image pickup element 743 included in an imaging information calculation section 74 is provided. The imaging information calculation section 74 is a system for analyzing image data taken by the controller 7 and determining an area having a high brightness in the image data, so as to detect the position of the center of gravity, the size, and the like of the area. The imaging information calculation section 74 has, for example, a maximum sampling period of about 200 frames/sec, and thus can trace and analyze even a relatively fast motion of the controller 7. The imaging information calculation section 74 will be described in detail below. Further, on the rear surface of the housing 71, the connector 73 is provided. The connector 73 is, for example, an edge connector, and is used for engaging and connecting with a connecting cable, for example.

Here, to make the following description specific, a coordinate system to be set for the controller 7 is defined. As shown in FIGS. 3 and 4, an X-axis, a Y-axis, and a Z-axis, which are orthogonal to one another, are defined for the controller 7. Specifically, the longitudinal direction of the housing 71 corresponding to the front-rear direction of the controller 7 is defined as a Z-axis direction, and a direction toward the front surface (a surface on which the imaging information calculation section 74 is mounted) of the controller 7 is defined as a Z-axis positive direction. Further, the up-down direction of the controller 7 is defined as a Y-axis direction, and a direction toward the bottom surface (a surface on which the operation button 72*i* is provided) of the housing 71 is defined as a Y-axis positive direction. Furthermore, the left-right direction of the controller 7 is defined as an X-axis direction, and a direction toward the left side surface (a side surface not shown in FIG. 3 but shown in FIG. 4) of the housing 71 is defined as an X-axis positive direction.

Figure 5:
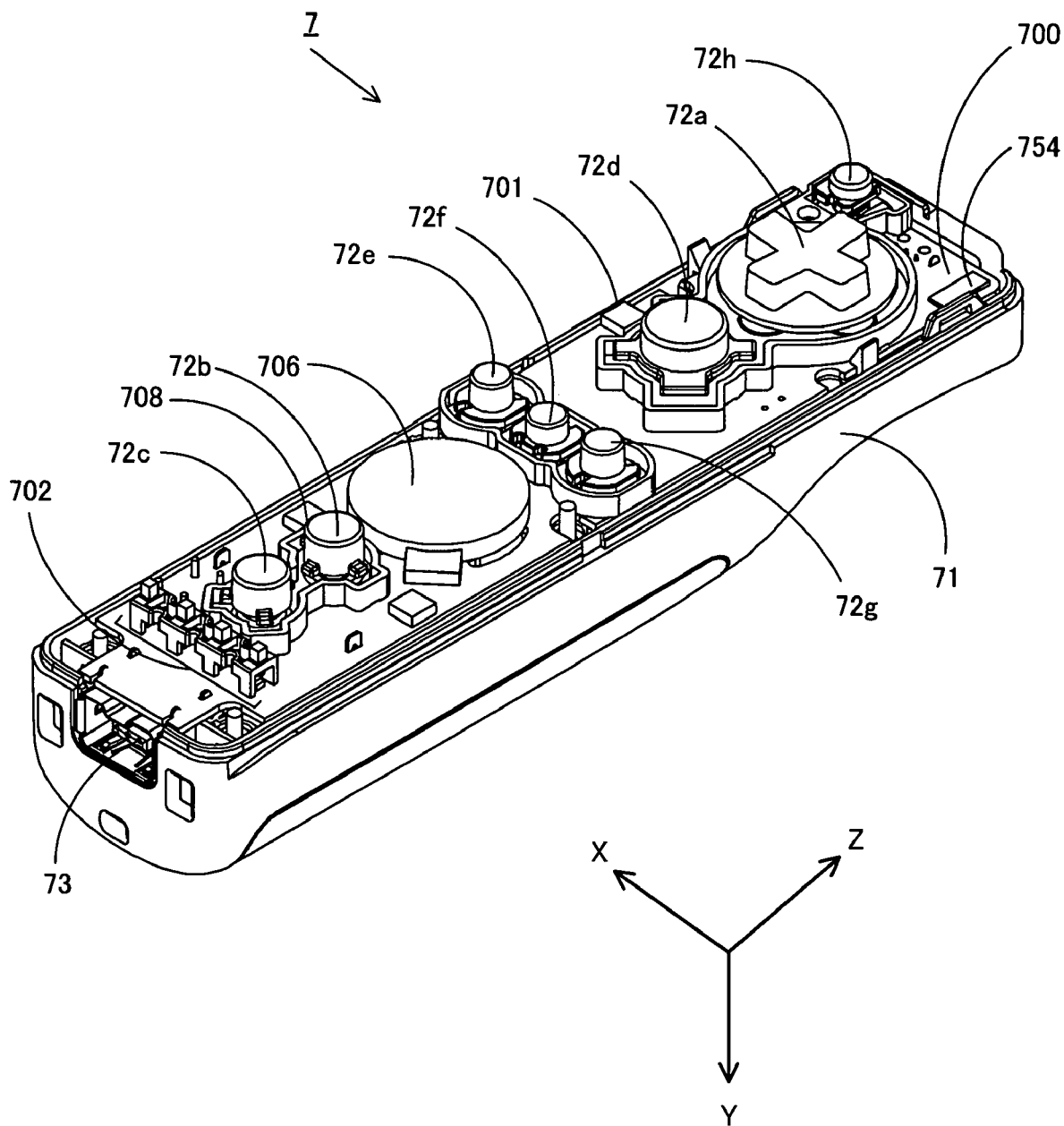
FIG. 5 is a perspective view showing a state where an upper casing of the controller 7 is removed.
Figure 6:
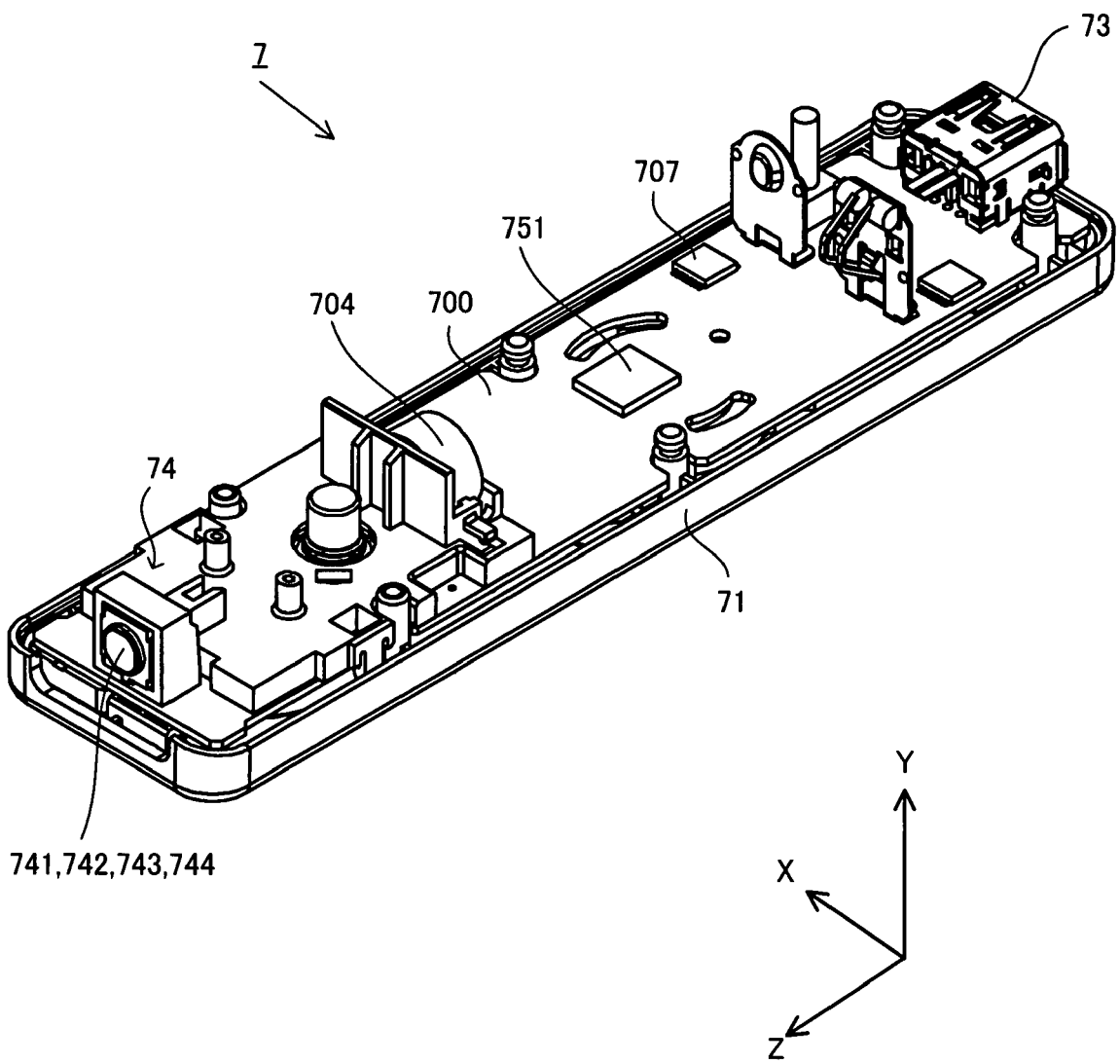
FIG. 6 is a perspective view showing a state where a lower casing of the controller 7 is removed.

Next, with reference to FIGS. 5 and 6, an internal structure of the controller 7 will be described. Note that FIG. 5 is a perspective view showing, as viewed from the top rear surface of the controller 7, a state where an upper casing (a part of the housing 71) of the controller 7 is removed. FIG. 6 is a perspective view showing, as viewed from the bottom front surface of the controller 7, a state where a lower casing (a part of the housing 71) of the controller 7 is removed. FIG. 6 is a perspective view showing the reverse side of a substrate 700 shown in FIG. 5.

As shown in FIG. 5, the substrate 700 is fixed inside the housing 71. On the top main surface of the substrate 700, the operation buttons 72*a*, 72*b*, 72*c*, 72*d*, 72*e*, 72*f*, 72*g* and 72*h*, an acceleration sensor 701, the LEDs 702, an antenna 754, and the like are provided. These elements are connected to a microcomputer 751 (see FIGS. 6 and 7) and the like via line (not shown) formed on the substrate 700 and the like. Further, a wireless module 753 (see FIG. 7) and the antenna 754 allow the controller 7 to act as a wireless controller. Note that a quartz oscillator 703 (not shown), which is provided within the housing 71, generates a reference clock of the microcomputer 751 described below. On the top main surface of the substrate 700, the speaker 706 and an amplifier 708 are provided. Furthermore, the acceleration sensor 701 is provided on the substrate 700 to the left of the operation button 72*d* (i.e., provided not at the center portion of the substrate 700 but near the periphery of the substrate 700). Accordingly, the acceleration sensor 701 is, in accordance with the controller 7 rotating about the longitudinal direction thereof, capable of detecting acceleration containing a component exerted due to the centrifugal force, as well as detecting a directional change of gravity acceleration. Therefore, the game apparatus 3 and the like can perform a predetermined calculation so as to determine rotation of the controller 7 with sufficient accuracy based on the detected acceleration data.

On the other hand, as shown in FIG. 6, at the front edge of the bottom main surface of the substrate 700, the imaging information calculation section 74 is provided. The imaging information calculation section 74 includes an infrared filter 741, a lens 742, the image pickup element 743, and an image processing circuit 744 located on the bottom main surface of the substrate 700 in order, respectively, from the front surface of the controller 7. At the rear edge of the bottom main surface of the substrate 700, the connector 73 is attached. Further, on the bottom main surface of the substrate 700, a sound IC 707 and the microcomputer 751 are provided. The sound IC 707, connected to the microcomputer 751 and the amplifier 708 via the line formed on the substrate 700 and the like, outputs a sound signal to the speaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704, connected to the microcomputer 751 via the line formed on the substrate 700 and the like, is powered on/off in accordance with vibration data transmitted from the game apparatus 3. The controller 7 is vibrated by an actuation of the vibrator 704, and the vibration is conveyed to the player's hand holding the controller 7. Thus, a so-called vibration-feedback game can be realized. The vibrator 704 is provided near the front part of the housing 71, and therefore a large vibration of the housing 71 allows the player holding the controller 7 to easily feel the vibration.

Next, with reference to FIG. 7, an internal structure of the controller 7 will be described. Note that FIG. 7 is a block diagram showing a structure of the controller 7.

Figure 7:
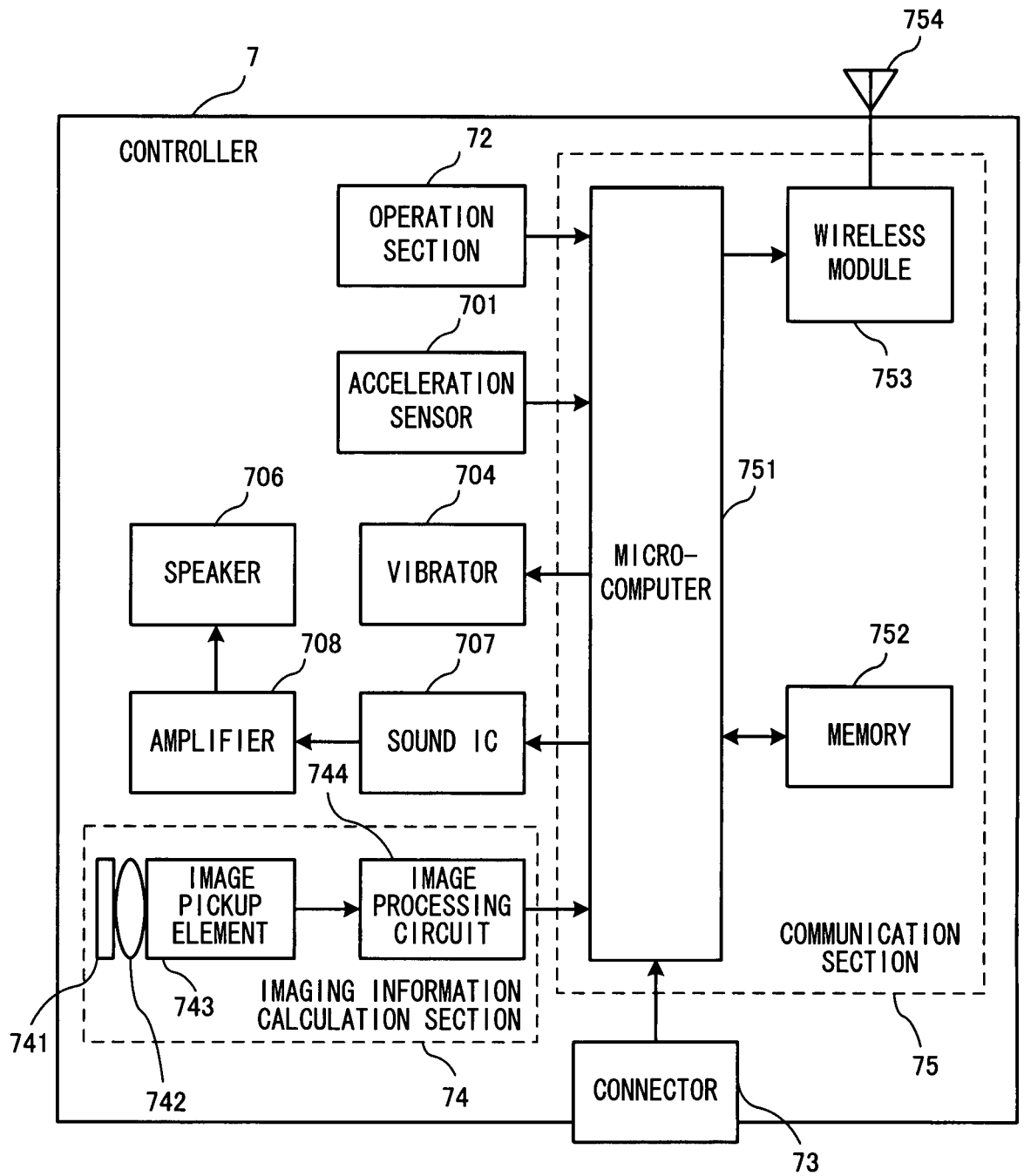
FIG. 7 is a block diagram showing a structure of the controller 7.

As shown in FIG. 7, the controller 7 includes a communication section 75, in addition to the operation sections 72, the imaging information calculation section 74, the acceleration sensor 701, the vibrator 704, the speaker 706, the sound IC 707, and the amplifier 708 as described above.

The imaging information calculation section 74 includes the infrared filter 741, the lens 742, the image pickup element 743, and the image processing circuit 744. The infrared filter 741 allows only infrared light to pass therethrough, among light incident on the front surface of the controller 7. The lens 742 collects the infrared light which has passed through the infrared filter 741, so as to output the infrared light to the image pickup element 743. The image pickup element 743 is a solid-state image pickup device such as a CMOS sensor or a CCD. The image pickup element 743 takes an image of the infrared light collected by the lens 742. Accordingly, the image pickup element 743 takes an image of only the infrared light which has passed through the infrared filter 741, so as to generate image data. The image data generated by the image pickup element 743 is processed by the image processing circuit 744. Specifically, the image processing circuit 744 processes the image data obtained by the image pickup element 743, senses an area thereof having a high brightness, and outputs the process result data, which represent the detected position coordinates and size of the area, to the communication section 75. Note that the imaging information calculation section 74 is fixed to the housing 71 of the controller 7, and therefore the imaging direction of the imaging information calculation section 74 can be changed by changing the direction of the housing 71.

The controller 7 preferably includes a three-axial (X-axis, Y-axis, and Z-axis) acceleration sensor 701. The three-axial acceleration sensor 701 senses linear acceleration in three directions, that is, the up-down direction (the Y-axis shown in FIG. 3), the left-right direction (the X-axis shown in FIG. 3), and the front-rear direction (the Z-axis shown in FIG. 3).

The communication section 75 includes the microcomputer 751, a memory 752, the wireless module 753, and the antenna 754. The microcomputer 751 controls the wireless module 753 for wirelessly transmitting transmission data while using the memory 752 as a storage area during the process. Further, the microcomputer 751 controls operations of the sound IC 707 and the vibrator 704, based on data received by the wireless module 753 from the game apparatus 3 via the antenna 754. The sound IC 707 processes sound data and the like transmitted from the game apparatus 3 via the communication section 75. Furthermore, the microcomputer 751 actuates the vibrator 704 based on, for example, vibration data (e.g., a signal for powering the vibrator 704 on/off) transmitted from the game apparatus 3 via the communication section 75.

Data from the controller 7 including an operation signal (key data) from the operation section 72, three-axial direction acceleration signals (X-axis, Y-axis and Z-axis direction acceleration data) from the acceleration sensor 701, and the process result data from the imaging information calculation section 74 is outputted to the microcomputer 751. The microcomputer 751 temporarily stores, in the memory 752, the respective data (the key data, the X-axis, Y-axis and Z-axis direction acceleration data, and the process result data) as transmission data to be transmitted to the wireless controller module 19. The wireless transmission from the communication section 75 to the wireless controller module 19 is performed periodically at predetermined time intervals. Since game processing is generally performed in a cycle of 1/60 sec., the wireless transmission is required to be performed in a shorter cycle time. Specifically, the game processing unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs, as a series of operation information to the wireless module 753, the transmission data stored in the memory 752. The wireless module 753 uses, for example, the Bluetooth (registered trademark) technology so as to transmit the operation information as an electric wave signal thereof from the antenna 754 by using a carrier wave of a predetermined frequency. That is, the data from the controller 7 including the key data from the operation section 72, the X-axis, Y-axis and Z-axis direction acceleration data from the acceleration sensor 701, and the process result data from the imaging information calculation section 74 is transmitted from the controller 7. The wireless controller module 19 of the game apparatus 3 receives the electric wave signal, and the game apparatus 3 demodulates or decodes the electric wave signal so as to obtain the series of the operation information (the key data, X-axis, Y-axis and Z-axis direction acceleration data, and the process result data). Based on the obtained operation information and the game program, the CPU 10 of the game apparatus 3 performs the game processing. Note that in a case where the communication section 75 is structured using the Bluetooth (registered trademark) technology, the communication section 75 can also have a function of receiving transmission data wirelessly transmitted from other devices.

Note that the above-described hardware structure is provided only for illustrative purposes, and other computer systems may be implemented.

Next, an overview of an image generation process performed by the game apparatus 3 will be described.

Certain example embodiments are directed to drawing, by using multilayer polygonal models, the surface shape of a three-dimensional object, such as an accumulation of snow, soil, sand, or bricks, positioned in a virtual space. Needless to say, other embodiments may be used for drawing the surface shape of an object other than an accumulation of snow, soil, sand, or bricks.

Figure 8:
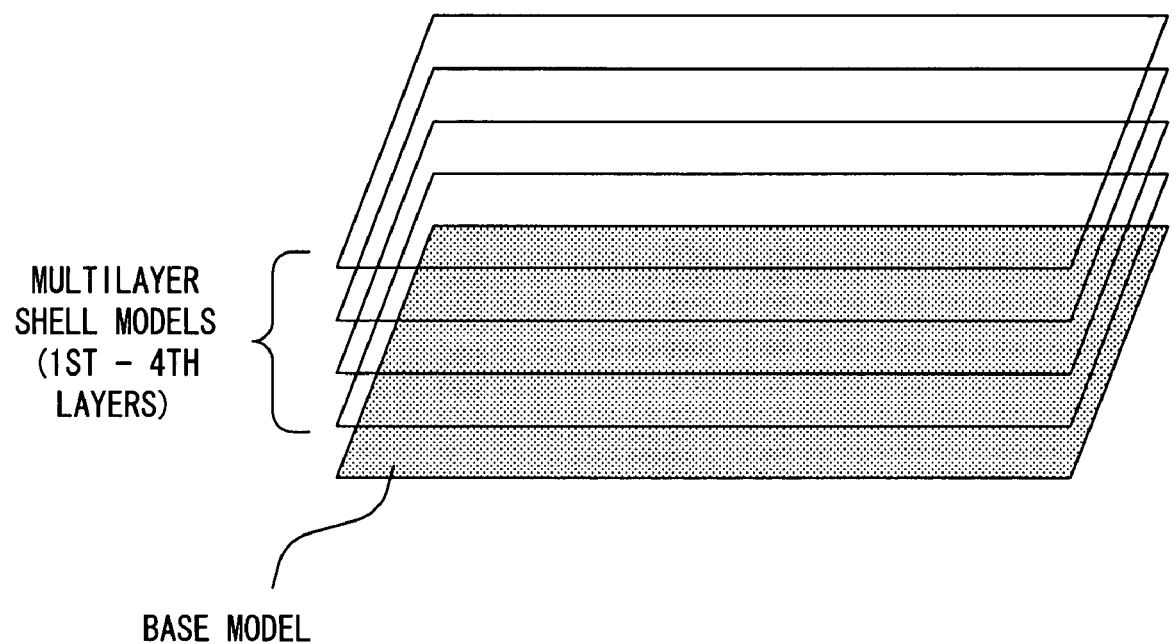
FIG. 8 is a diagram showing positional relationships among a base model and multilayer shell models.

In the present embodiment, as shown in FIG. 8, a plurality of shell models are positioned, as multilayer polygonal models, in layers (i.e., generally in parallel to one another) on a base model representing the ground and the like, in a virtual space. The base model and each layer of the shell models each include one or more polygons. Although, in the present embodiment, described is a case where the multilayer shell models include four-layer shell models, the number of layers of the multilayer shell models is not limited thereto. The greater the number of layers is, the more spectacularly the three-dimensional object can be displayed. Note that the shell models may be positioned at regular intervals or may not. Further, although, as shown in the example of FIG. 8, the base model and each layer of the shell models are plate-shaped, in other example embodiments the base model and each layer of the shell models may be in any arbitrary shape such as a cylindrical shape.

The base model is constructed based on base model data (data including vertex coordinates of each of the polygons included in the base model and the like). The base model is texture-mapped, as necessary, with a texture image representing, for example, a design of the ground.

Each layer of the shell models is constructed based on shell model data (data including vertex coordinates of each of the polygons included in each layer of the shell models). Note that in the present embodiment, the shell model data is automatically generated based on the base model data, in the game apparatus 3. Specifically, for example, based on the base model data, new vertices are generated by shifting vertices of each of the polygons included in the base model by predetermined distances in normal vector directions, and thus the shell models can be generated based on the generated vertices. Note that instead of being generated based on the base model data, the shell model data may be generated in advance and stored in the optical disc 4, so as to be loaded from the optical disc 4 to the external main memory 12. As a data structure, for example, the shell model data may include only coordinate data of the vertices and share, with the base model data, topology information representing connection relationships among the vertices included in each of the polygons, connection relationships among the polygons, and the like, or the shell model data may store therein both the coordinate data and the topology information, with respect to each layer. Note that in a case where the shell model data is automatically generated based on the base model data, the number of layers of the shell models to be automatically generated may be changeable in accordance with user input or other arbitrary conditions (e.g., the distance between a virtual camera and the shell models). A color or a design is placed on each layer of the shell models in accordance with a three-dimensional object to be drawn. Note, however, that the color or the design is not placed on the whole region of the shell models, but placed on a portion of the shell models in accordance with the height of the three-dimensional object to be drawn. The present embodiment employs a height map as information indicating the height of the three-dimensional object to be drawn.

Figure 9A:
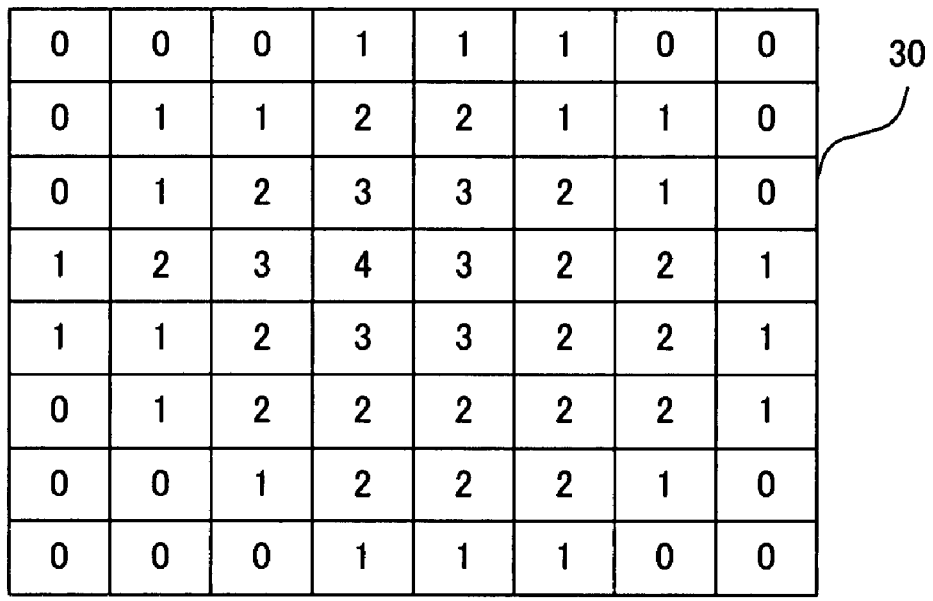
FIG. 9A is a specific example of a height map 30.

FIG. 9A is an example of the height map. As shown in FIG. 9A, a height map 30 includes height data values, arranged in a two-dimensional array, each of which indicates the height of each position provided on the three-dimensional object to be drawn. Although, as shown in the example of FIG. 9A, the number of elements (a resolution) of the height map 30 is 8×8=64, the present invention is not limited thereto. Further, although, as shown in the example of FIG. 9A, the gray level of each of the height data values has only five levels ranging from 0 to 4, the present invention is not limited thereto. For example, the gray level of the height map 30 may have 256 levels ranging from 0 to 255. The higher the resolution of the height map 30 is, or the more levels the gray level of the height map 30 has and the larger the number of layers of the shell models is, the more finely the three-dimensional object can be drawn.

Figure 9B:
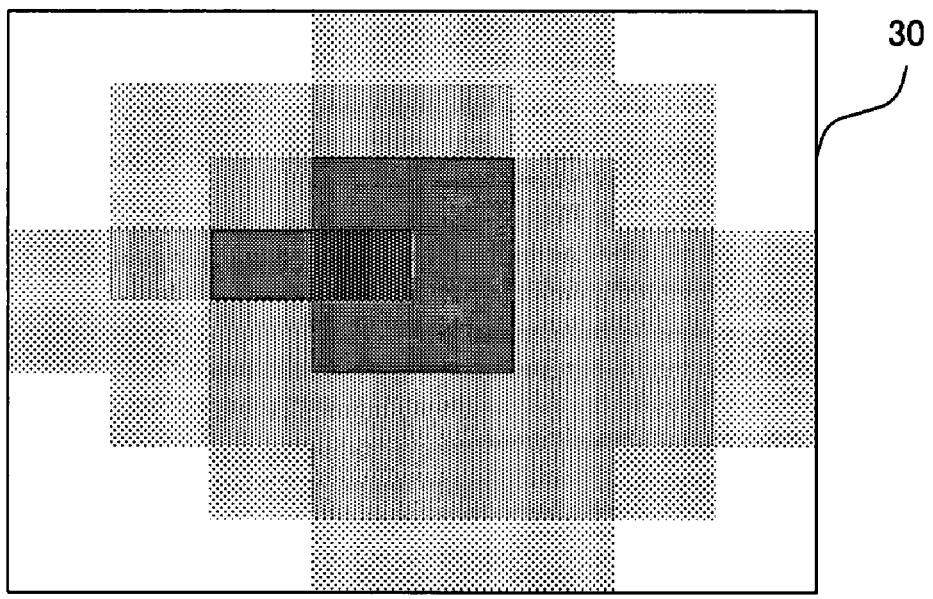
FIG. 9B is a specific example of the height map 30 displayed as an image on a display screen.

Note that when the height map 30 is displayed on the display screen using the height data values of the height map 30 as pixel values, the height map 30 of FIG. 9A is displayed as an image shown in FIG. 9B, on the display screen. Thus, the height map 30 can be created and changed by image editing software, checked on the display screen, and the like, as if a texture image. Note that as shown in the example of FIG. 9B, for convenience, the larger the height data value is, the blacker the corresponding position is (the smaller the height data value is, the whiter the corresponding position is), but the present invention is not limited thereto. Note that each layer of the shell models is mapped with the height map 30 using a method similar to that used for texture-mapping a polygonal model with a texture image. That is, the height map 30 is treated as an image and a predetermined calculation is performed for the image, such that each layer of the shell models is mapped with the calculation result. As a result, the surface shape can be drawn by the same process as that of normal texture mapping. Due to the above-described commonality between the height map 30 and a texture image, each element of the height map 30 is referred to as a "texel". Similarly, a coordinate indicating each position provided on the height map 30 is referred to as a "texture coordinate".

Note that the height data values of the height map 30 may be defined by functions. For example, the height data value of each position provided on the height map 30 may be defined by a function f(u, v) of which an argument is a texture coordinate (u, v), or may be defined by a function of which an argument is a variable (e.g., a time variable t) other than a texture coordinate.

Figure 10:
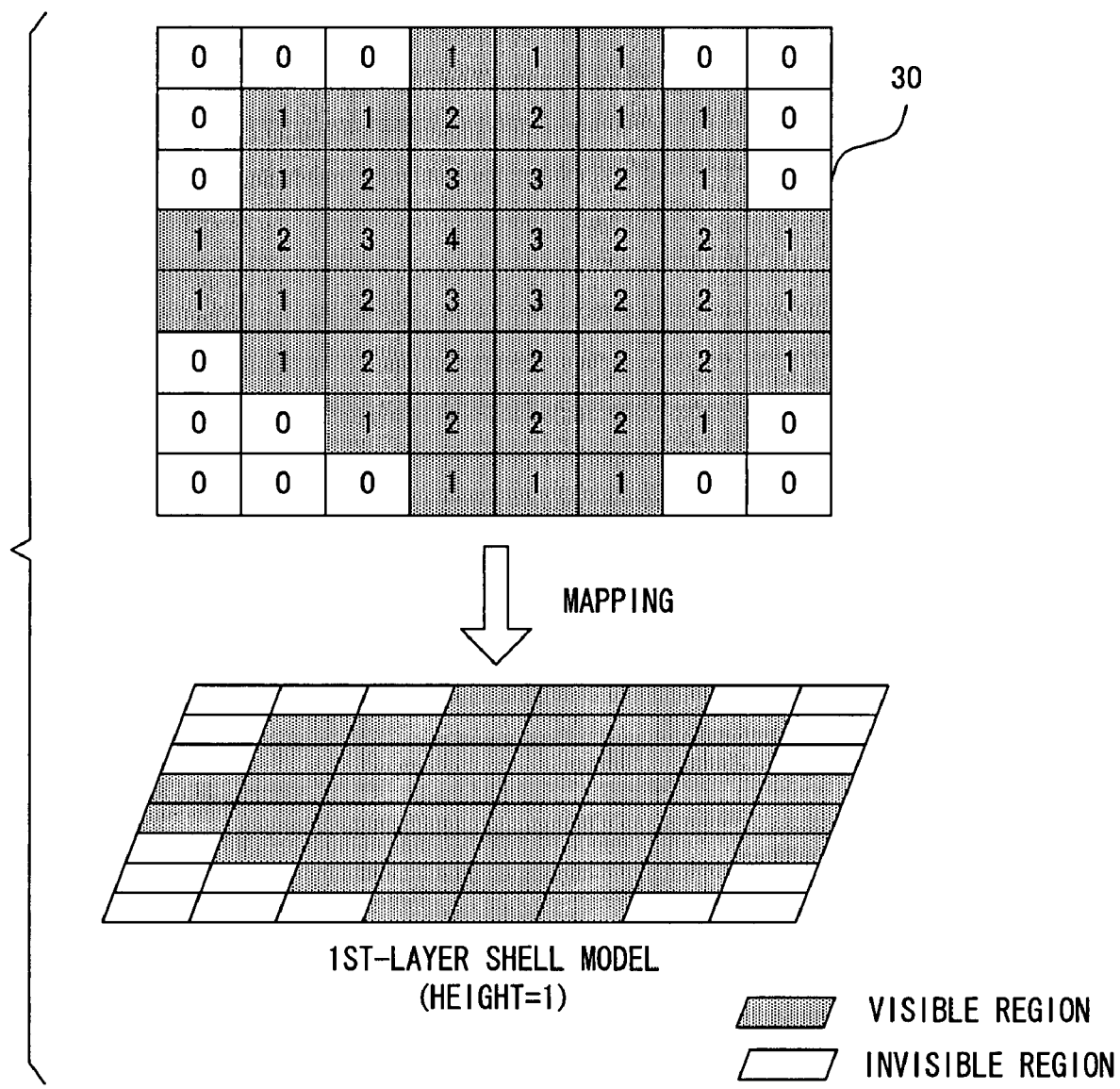
FIG. 10 is a diagram showing a method of drawing a first-layer shell model.

FIG. 10 shows a detailed process of drawing the first-layer shell model using the height map 30. As described above, the first-layer shell model is mapped with the height map 30 using a method similar to that used for texture-mapping a polygonal model with a texture image. "Mapping" is used herein refers to a process of determining each position which is provided on the height map and corresponds to each position which is provided on each layer of the shell models. In the present embodiment, each layer of the shell models is mapped with the height map 30 by UV mapping. UV mapping is a method for mapping a polygon with a texture image (the height map 30 in this case) by determining, based on texture coordinates corresponding to and assigned to vertices of the polygon, a texture coordinate corresponding to each position (the vertices and points other than the vertices) provided on the polygon. Note that UV mapping is provided only for illustrative purposes, and another arbitrary mapping method may be employed for the present embodiment.

In the present embodiment, the height data value of each position provided on the height map is compared to the heights of the shell models, so as to determine whether each position provided on the height map is a visible region or an invisible region. The heights of the shell models are set with respect to each layer.

For example, in a case where the height of the first-layer shell model is set as "1", the first-layer shell model is mapped with a texel having the height data value of equal to or greater than 1 in the height map 30 of FIG. 10, so as to determine a visible region, and is mapped with a texel having the height data value of less than 1 in the height map 30 of FIG. 10, so as to determine an invisible region. The visible region determined as a result of mapping and provided on the first-layer shell model is drawn in a predetermined color, and the invisible region provided thereon is not drawn (i.e., is to be transparent). When the height map 30 is considered as an image, the texel values are converted to values representing the heights, so as to perform texture mapping based on the converted texel values.

Figure 11:
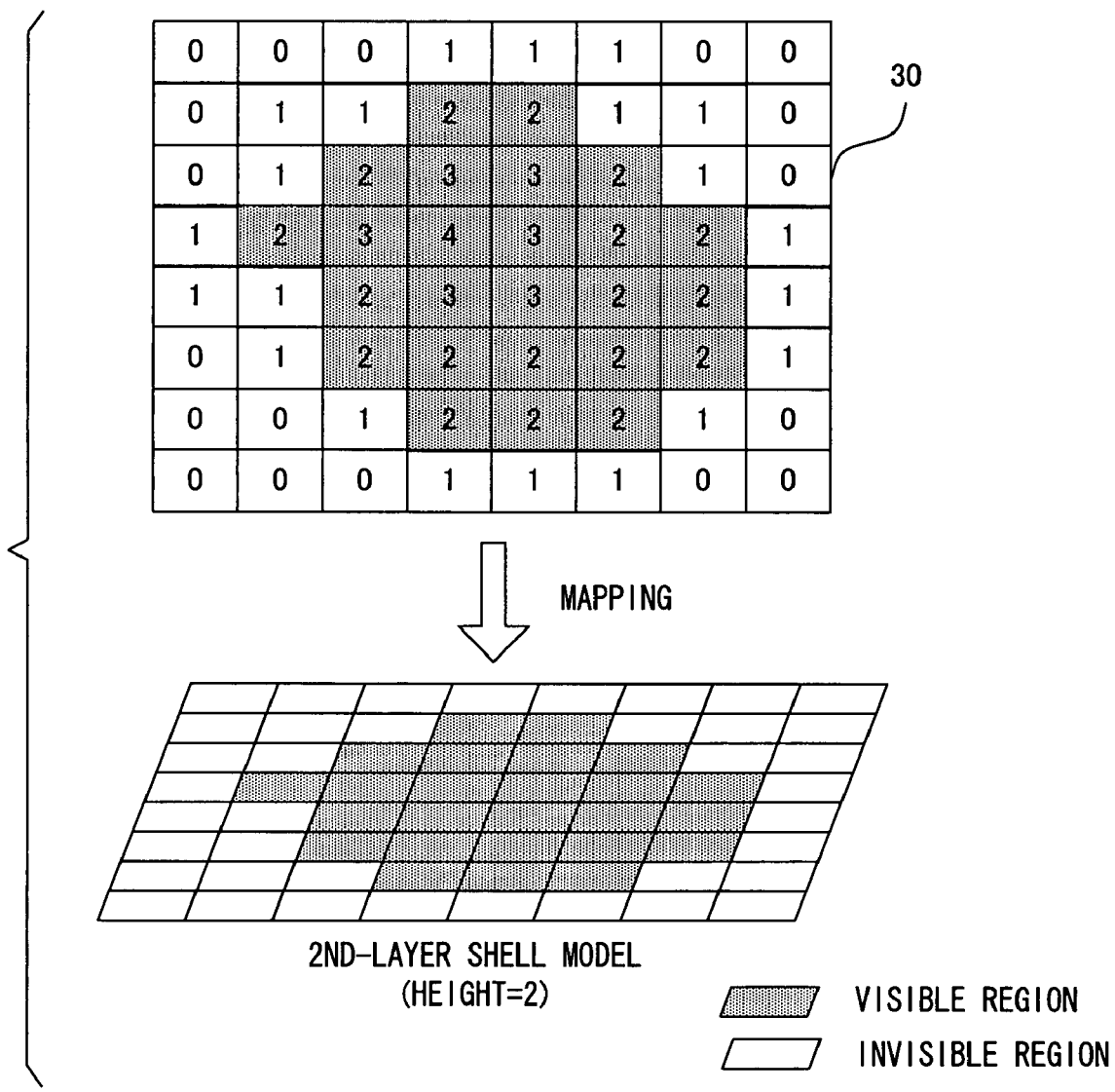
FIG. 11 is a diagram showing a method of drawing a second-layer shell model.

Similarly, in a case where the height of the second-layer shell model is set as "2", the second-layer shell model is mapped with a texel having the height data value of equal to or greater than 2 in the height map 30 of FIG. 11, so as to determine a visible region, and is mapped with a texel having the height data value of less than 2 in the height map 30 of FIG. 11, so as to determine an invisible region. The visible region determined as a result of mapping and provided on the second-layer shell model is drawn in a predetermined color, and the invisible region provided thereon is not drawn (i.e., is to be transparent).

Figure 12:
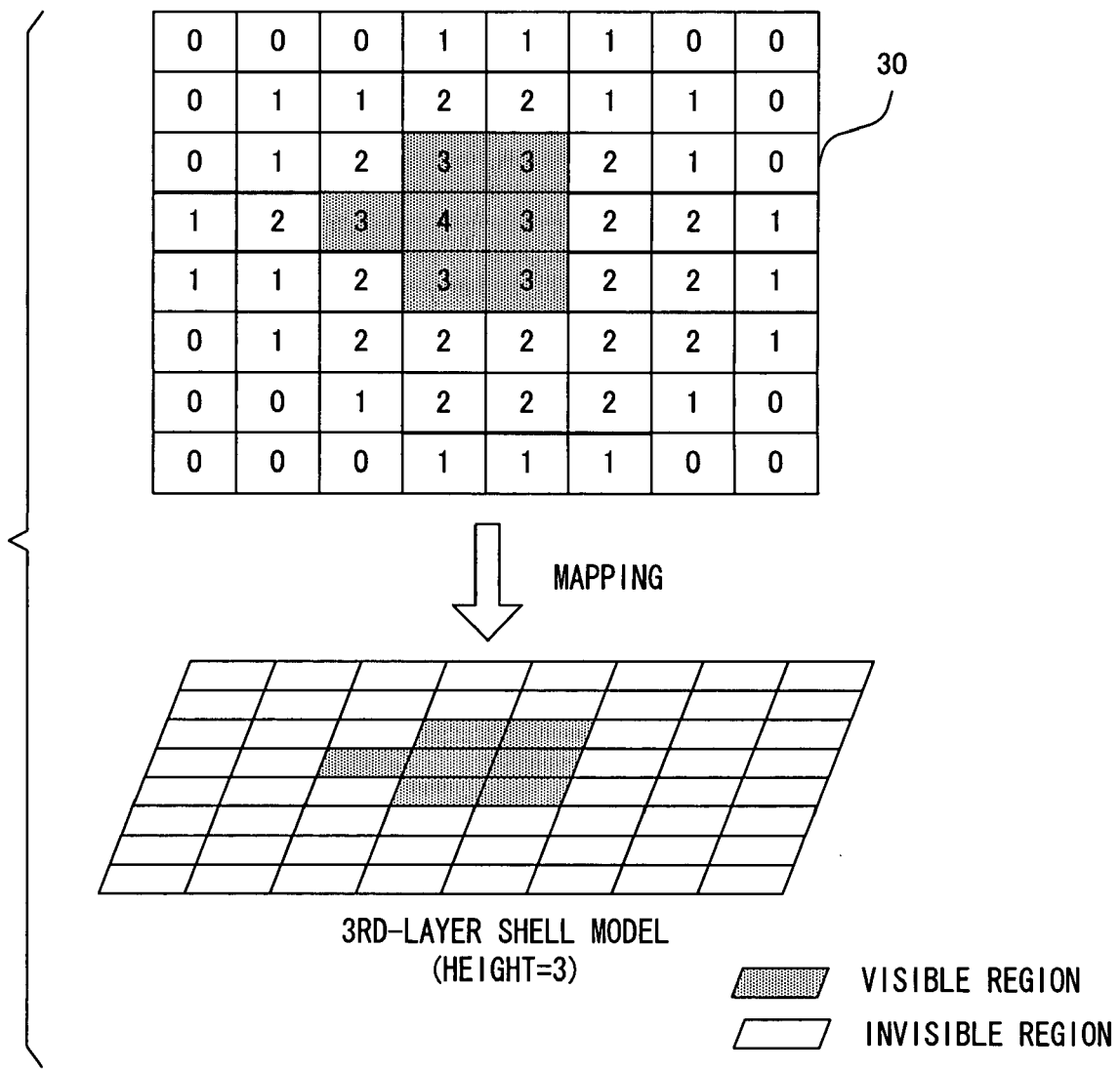
FIG. 12 is a diagram showing a method of drawing a third-layer shell model.

Similarly, in a case where the height of the third-layer shell model is set as "3", the third-layer shell model is mapped with a texel having the height data value of equal to or greater than 3 in the height map 30 of FIG. 12, so as to determine a visible region, and is mapped with a texel having the height data value of less than 3 in the height map 30 of FIG. 12, so as to determine an invisible region. The visible region determined as a result of mapping and provided on the third-layer shell model is drawn in a predetermined color, and the invisible region provided thereon is not drawn (i.e., is to be transparent).

Figure 13:
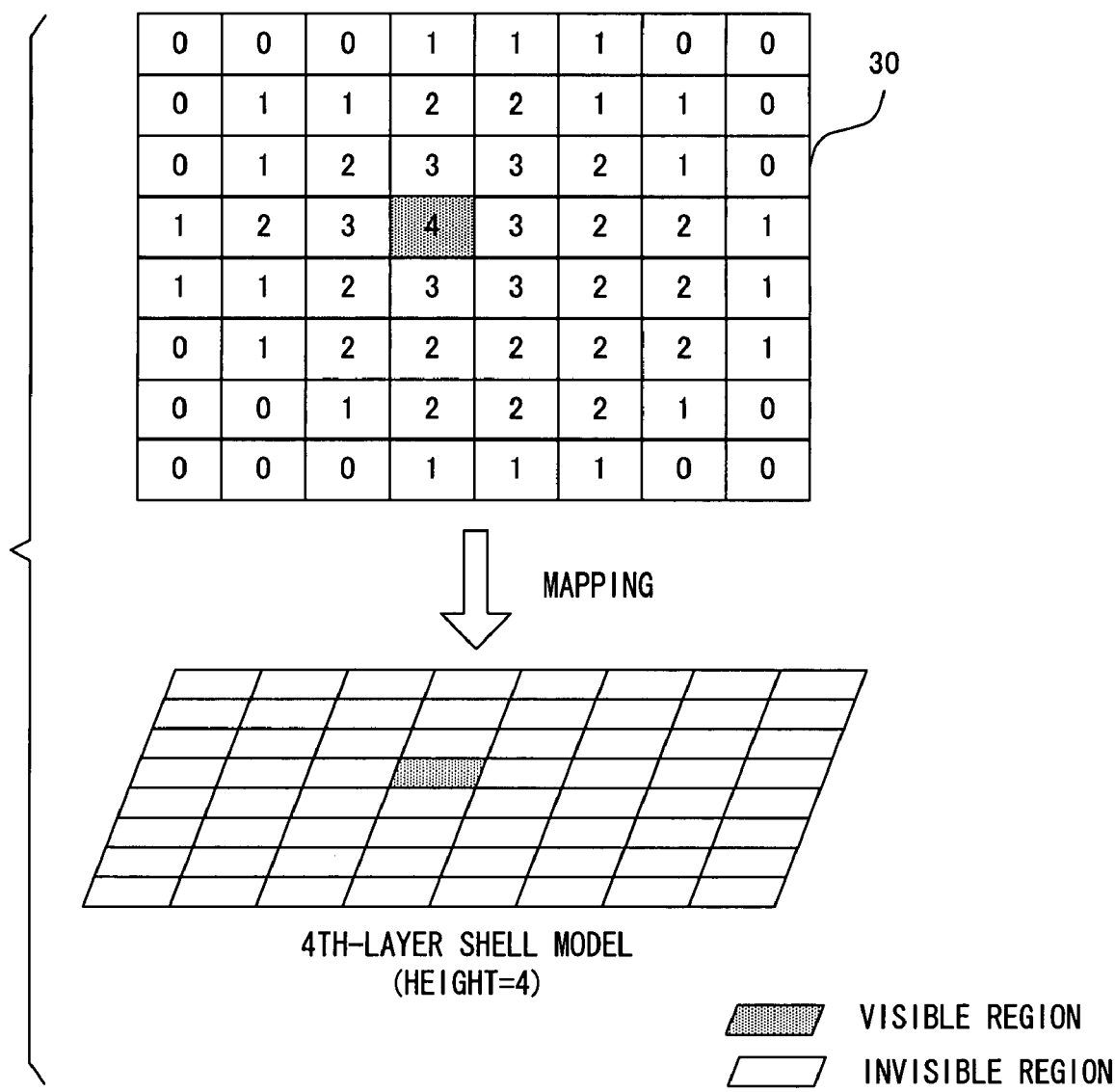
FIG. 13 is a diagram showing a method of drawing a fourth-layer shell model.

Similarly, in a case where the height of the fourth-layer shell model is set as "4", the fourth-layer shell model is mapped with a texel having the height data value of equal to or greater than 4 in the height map 30 of FIG. 13, so as to determine a visible region, and is mapped with a texel having the height data value of less than 4 in the height map 30 of FIG. 13, so as to determine an invisible region. The visible region determined as a result of mapping and provided on the fourth-layer shell model is drawn in a predetermined color, and the invisible region provided thereon is not drawn (i.e., is to be transparent).

Note that although, in the above example, the height of each layer of the shell models is represented by an integer, the present invention is not limited thereto, and the height thereof may be represented by a decimal.

Figure 14:
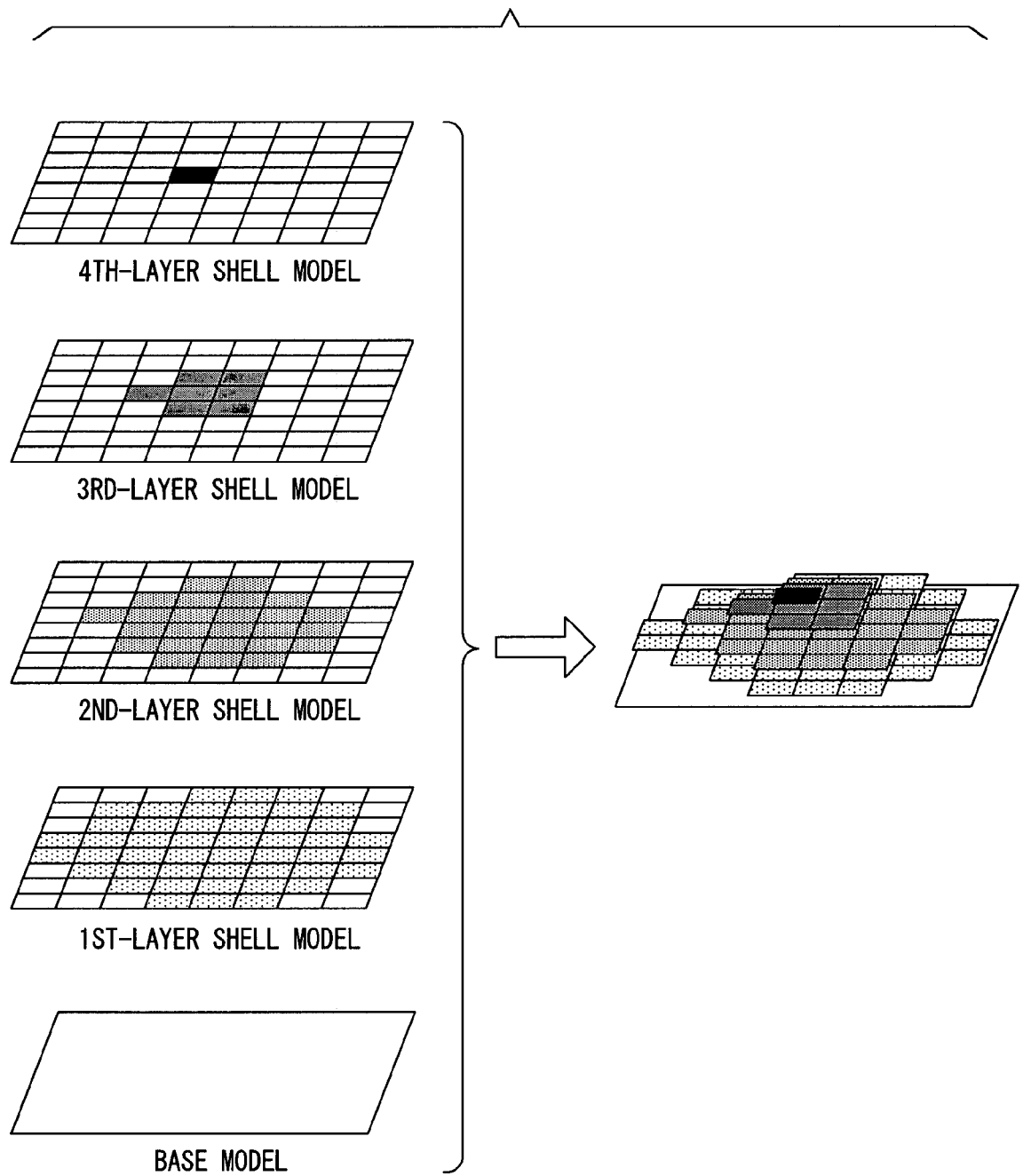
FIG. 14 is a diagram illustrating a three-dimensional object represented by the multilayer shell models.

When the visible regions of all of the first-layer through fourth-layer shell models have been drawn as described above, the three-dimensional object is displayed in a three-dimensional manner as shown in FIG. 14. Note that as shown in the example of FIG. 14, for convenience, the higher the layer is, the darker the color of the visible region is, but the present invention is not limited thereto, and the visible regions of all of the layers of the shell models may be drawn in the same color. Further, the visible regions of each layer of the shell models may be nontransparent, or may be semitransparent. In order to represent an accumulation of snow and the like, it may be preferable that the visible regions have certain transparency, which is likely to lead to a more natural representation. On the other hand, in order to represent, for example, a brick wall, it may be preferable that the visible regions are nontransparent. Furthermore, the transparency may vary depending on the layers. In order to represent an accumulation of snow, the transparency may be set such that the further outside the layer is, the greater the transparency thereof is.

Thus, according to certain example embodiments, it is possible to represent the surface shape of even a complex-shaped three-dimensional object by using layers of simple-shaped shell models.

Note that it is also possible to generate, by changing the value (the height data value) of each texel of the height map in a dynamic manner, a moving image of the shape of a three-dimensional object changing in a dynamic manner. Described below is an example of representing an accumulation of snow using the multilayer shell models and the height map. Note that in this case, the multilayer shell models include twelve-layer shell models, and the visible regions provided on each layer of the shell models are drawn in white (or in high intensity gray) and semi-transparently. Note that the color and the transparency may be gradually changed depending on the layers of the shell models. For example, the visible regions provided on the shell models positioned closer to the base model may be drawn in gray and by high transparency, and the visible regions provided on the shell models positioned farther from the base model may be drawn in white and by low transparency.

Figure 15:
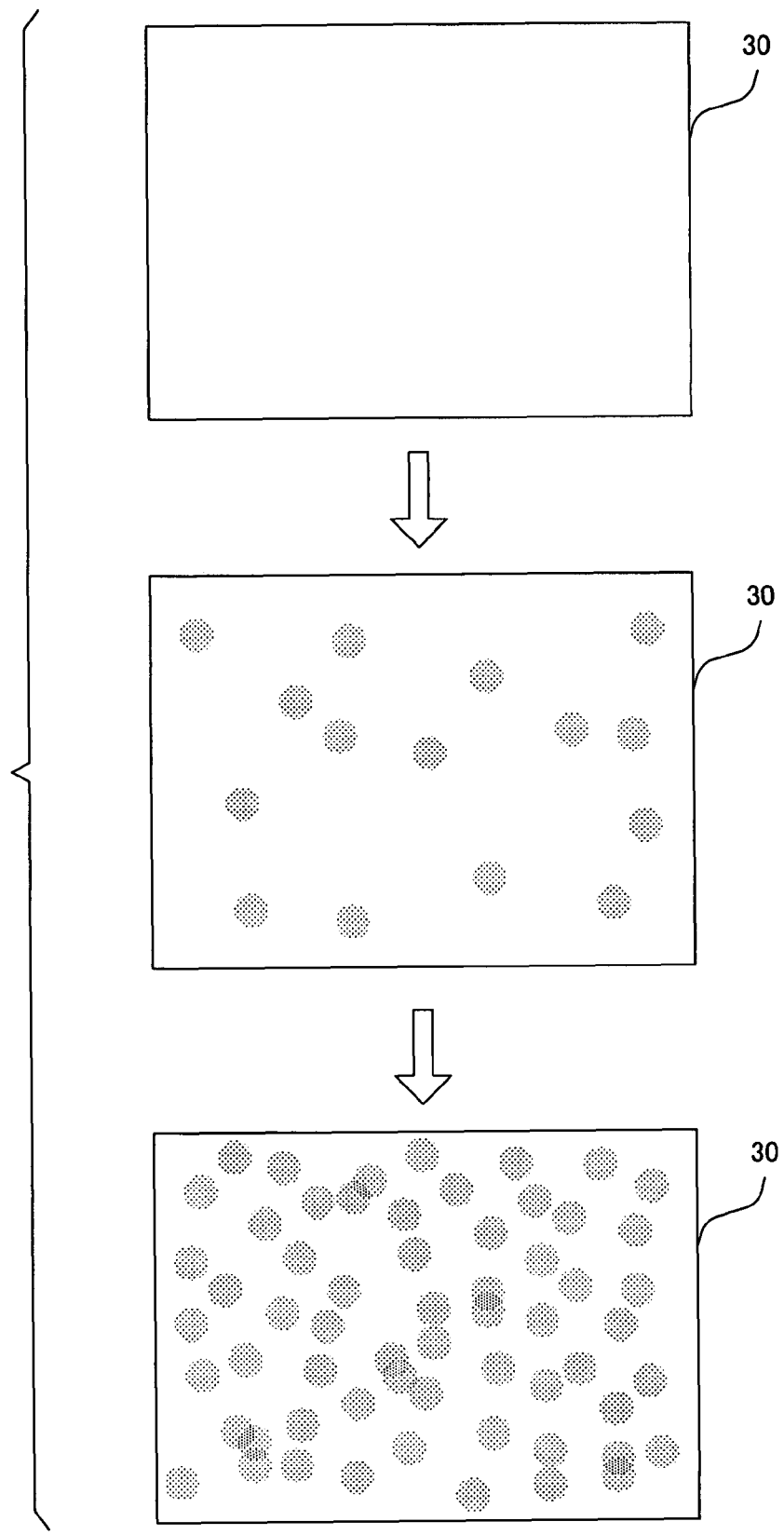
FIG. 15 is a diagram showing an exemplary method of updating the height map 30.

FIG. 15 shows an exemplary method of updating the height map used for representing snow gradually accumulating on the base model. In this example, a process of randomly selecting one or more texels from the texels included in the height map so as to increase the values of the randomly selected texels by a certain amount, is performed in a predetermined cycle (e.g., a cycle of 1/60 sec.) in a repeated manner. As a result, snow irregularly and gradually accumulating on the base model is displayed on the display screen. Note that the upper limit of the height of the accumulation of snow depends on the height of the higher layer of the multilayer shell models.

Figure 16:
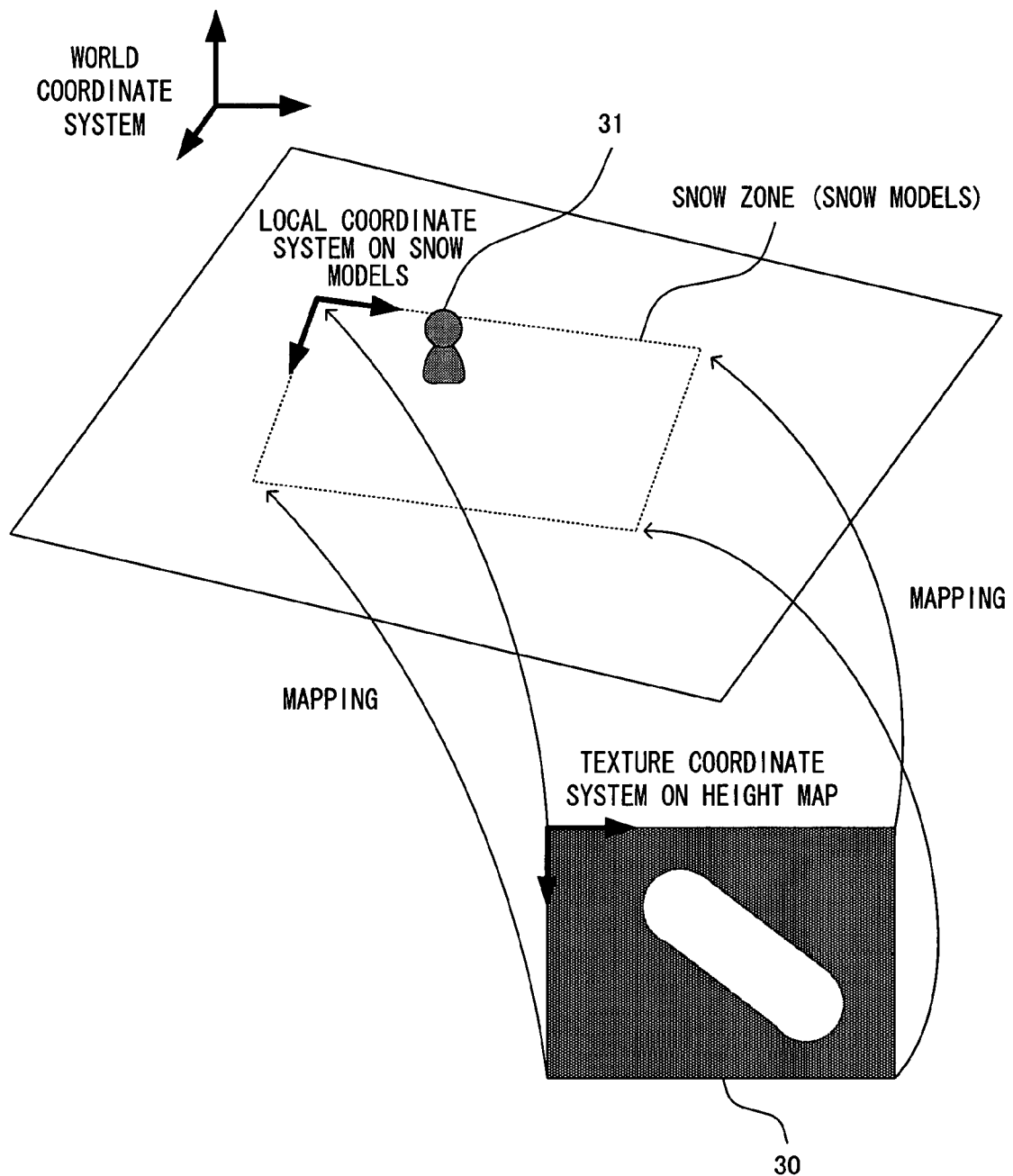
FIG. 16 is a diagram showing correspondence relationships among the current position of a moving object 31 and texels of the height map 30.

As an example of another application, it is also possible to represent a moving object (e.g., a character, of which the movement is controlled by a user using an input device) moving while pushing through an accumulation of snow. The above-described representation can be realized by updating the values of the height map in accordance with the current position of the moving object. With reference to FIG. 16, said another application will be described in detail below.

FIG. 16 illustrates a virtual world, in which a snow zone having snow accumulating therein and a moving object 31 are present. The snow zone includes the multilayer shell models (herein also referred to as "snow models") as described above. The moving object 31 includes a plurality of polygons. Vertices of polygons included in the snow models are associated with coordinates (of a texture coordinate system) of positions provided on the height map and corresponding to the vertices. Thus, it is possible to obtain a coordinate (of the texture coordinate system) of a position provided on the height map and corresponding to the current position of the moving object 31, by obtaining a coordinate (of a local coordinate system) of a position which is provided on the snow models and corresponds to the current position (of a world coordinate system) of the moving object 31, and also by obtaining a coordinate (of the texture coordinate system) of a position which is provided on the height map and corresponds to the position provided on the snow models.

Figure 17:
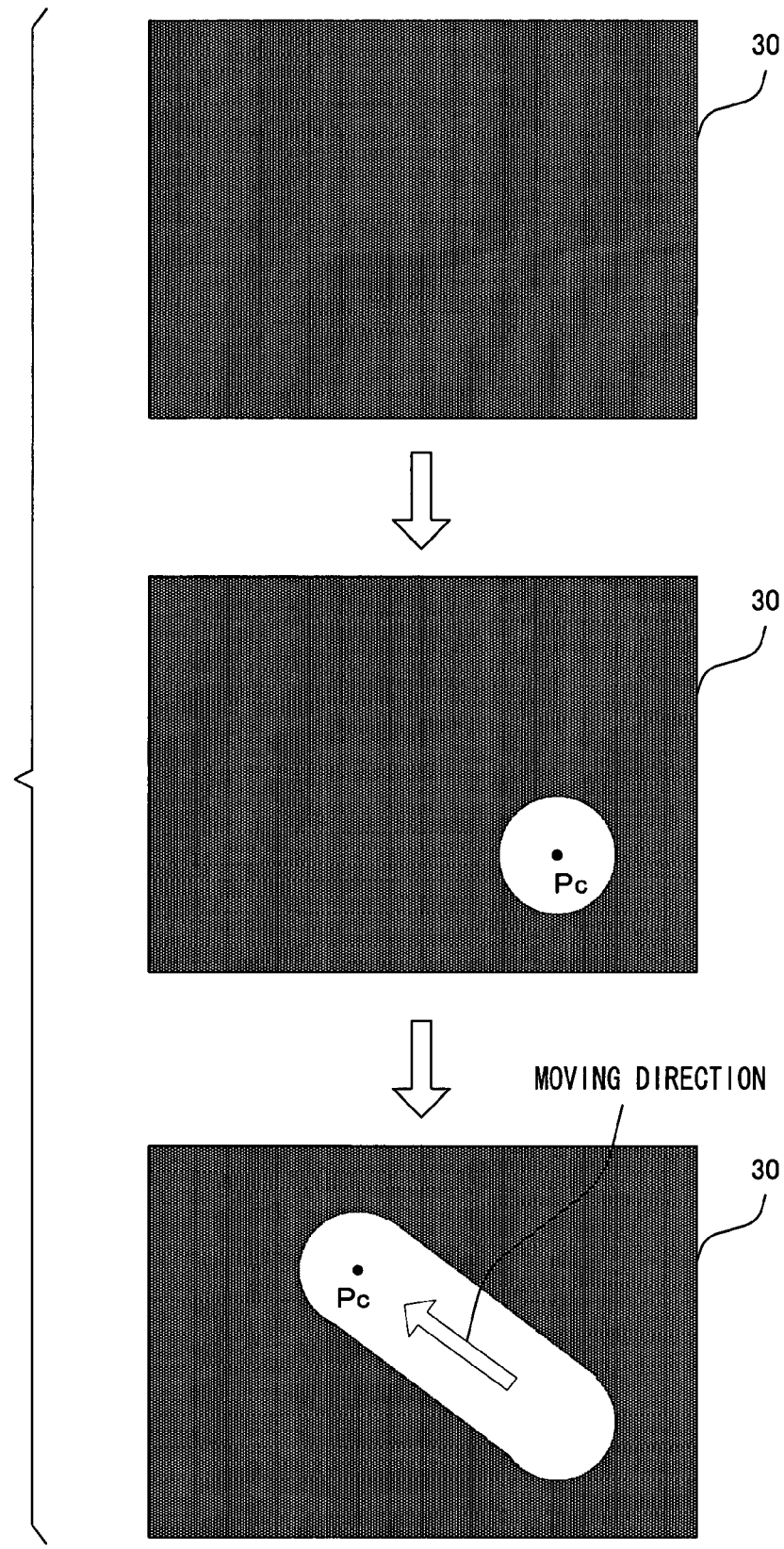
FIG. 17 is a diagram showing an exemplary method of updating the height map 30.

FIG. 17 shows an exemplary method of updating the height map used for representing the moving object 31 appearing in the snow zone and the moving object 31 then moving while pushing through an accumulation of snow. As shown in FIG. 17, a position Pc indicates a position provided on the height map and corresponding to the current position of the moving object 31. The position Pc is obtained as described above. As shown in the example of FIG. 17, each of the height data values of a circular region having a certain radius and having its center at the position Pc is updated to be 0. Note that each of the height data values of the circular region having a certain radius and having its center at the position Pc may not necessarily be 0 (i.e., a state where the snow at the foot of the moving object 31 is completely removed), and may be decreased to an appropriate value (i.e., a state where a small amount of the snow is left at the foot of the moving object 31) greater than 0. Note that each of the height data values having once been 0 may thereafter remain 0, or may be gradually and randomly increased as shown in FIG. 15. Note that the radius of the circular region may be set to have an appropriate value in accordance with the size of the moving object 31.

Figure 18:
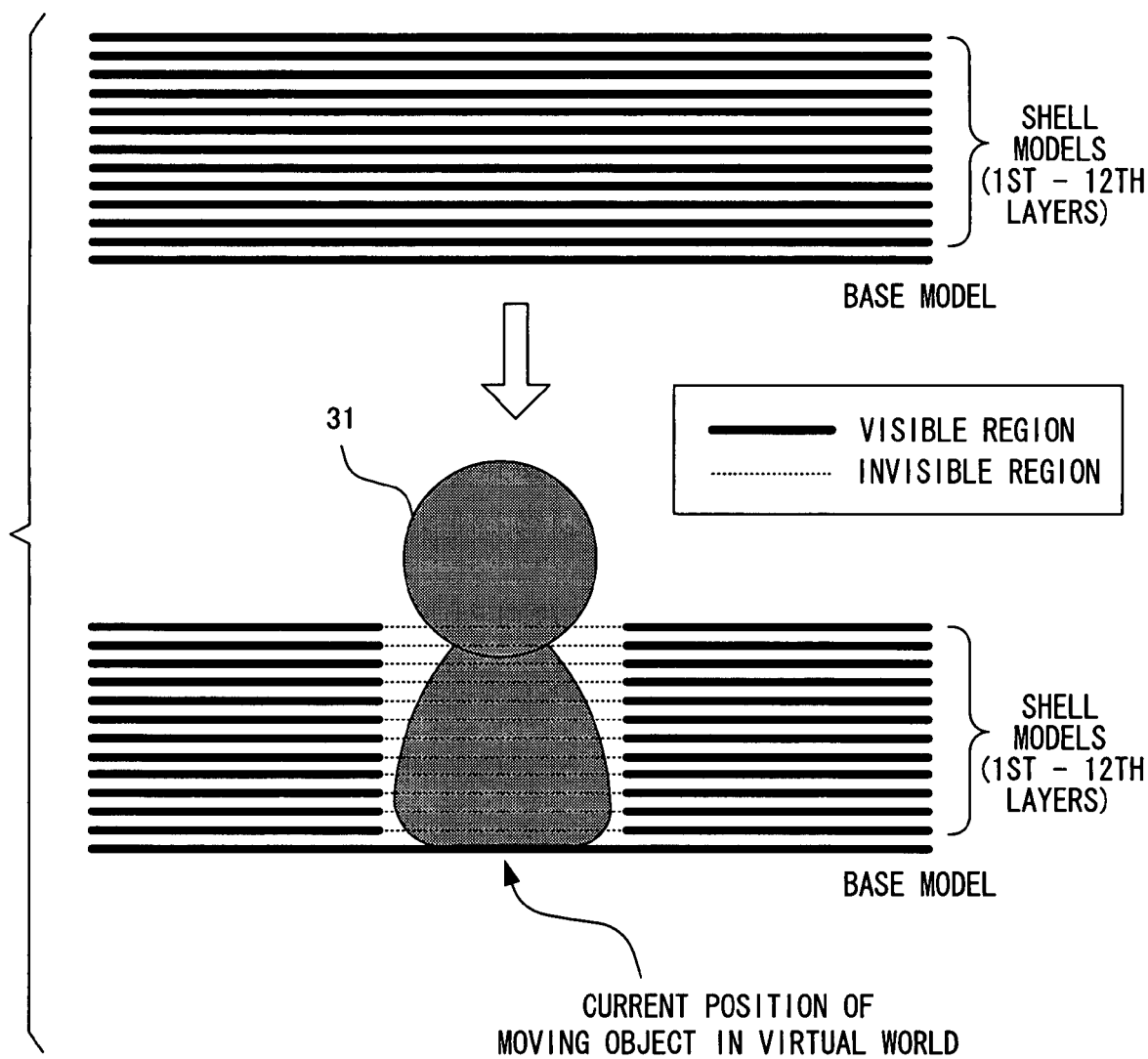
FIG. 18 is a diagram illustrating visible regions of the multilayer shell models changing in accordance with an update of the height map 30.
Figure 19:
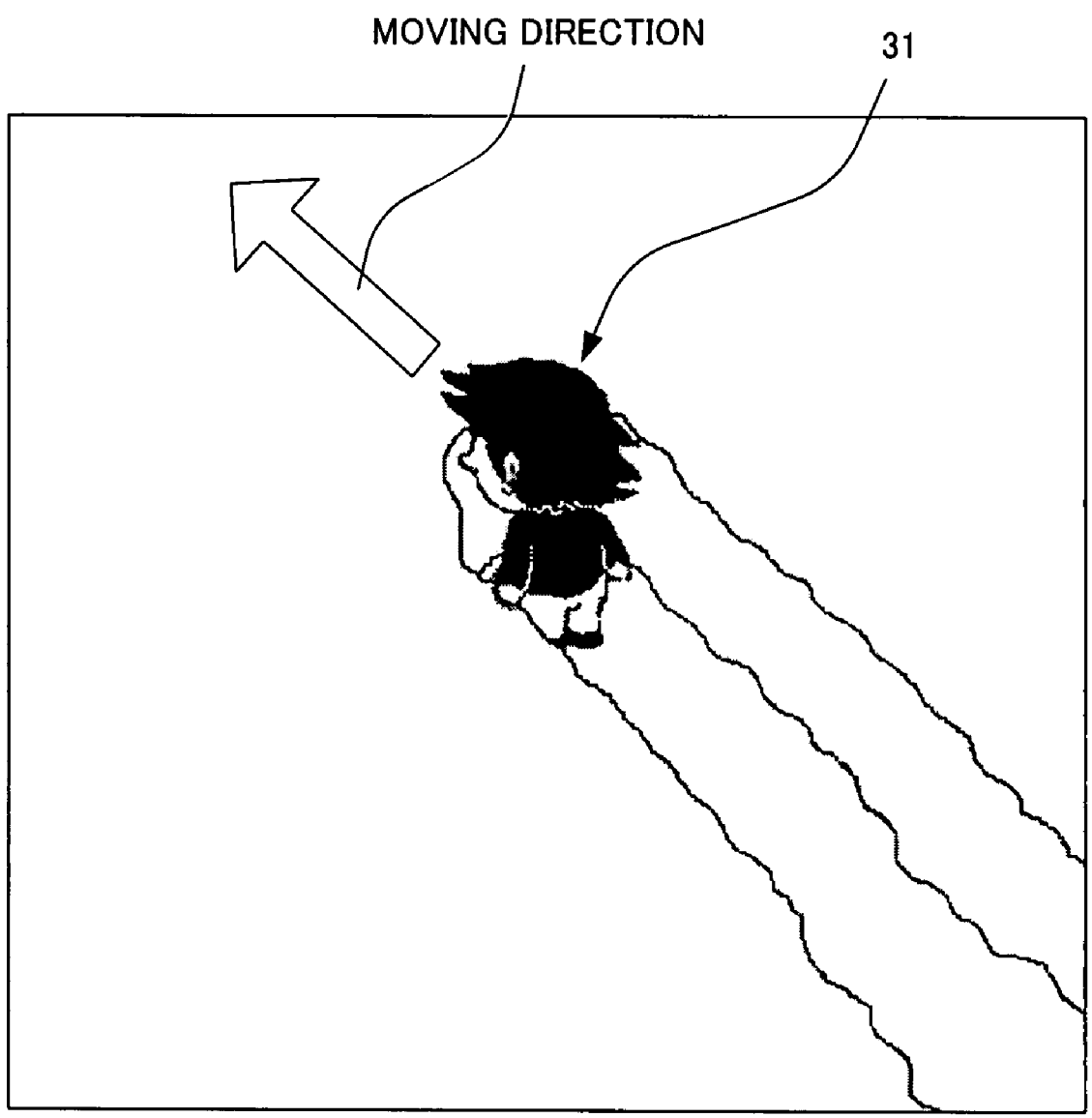
FIG. 19 is an example of an image to be ultimately generated.

FIG. 18 is a diagram illustrating the multilayer shell models used when the moving object 31 moves while pushing through the accumulation of snow. As described above, each of the height data values of a region immediately surrounding the position Pc which is provided on the height map and corresponds to the current position of the moving object 31 is updated to be 0, and therefore each layer of the shell models is to be invisible in a surrounding region of the current position of the moving object 31. As a result, it is displayed that the accumulation of snow is removed from only a region immediately surrounding the moving object 31 as shown in FIG. 19.

Figure 20:
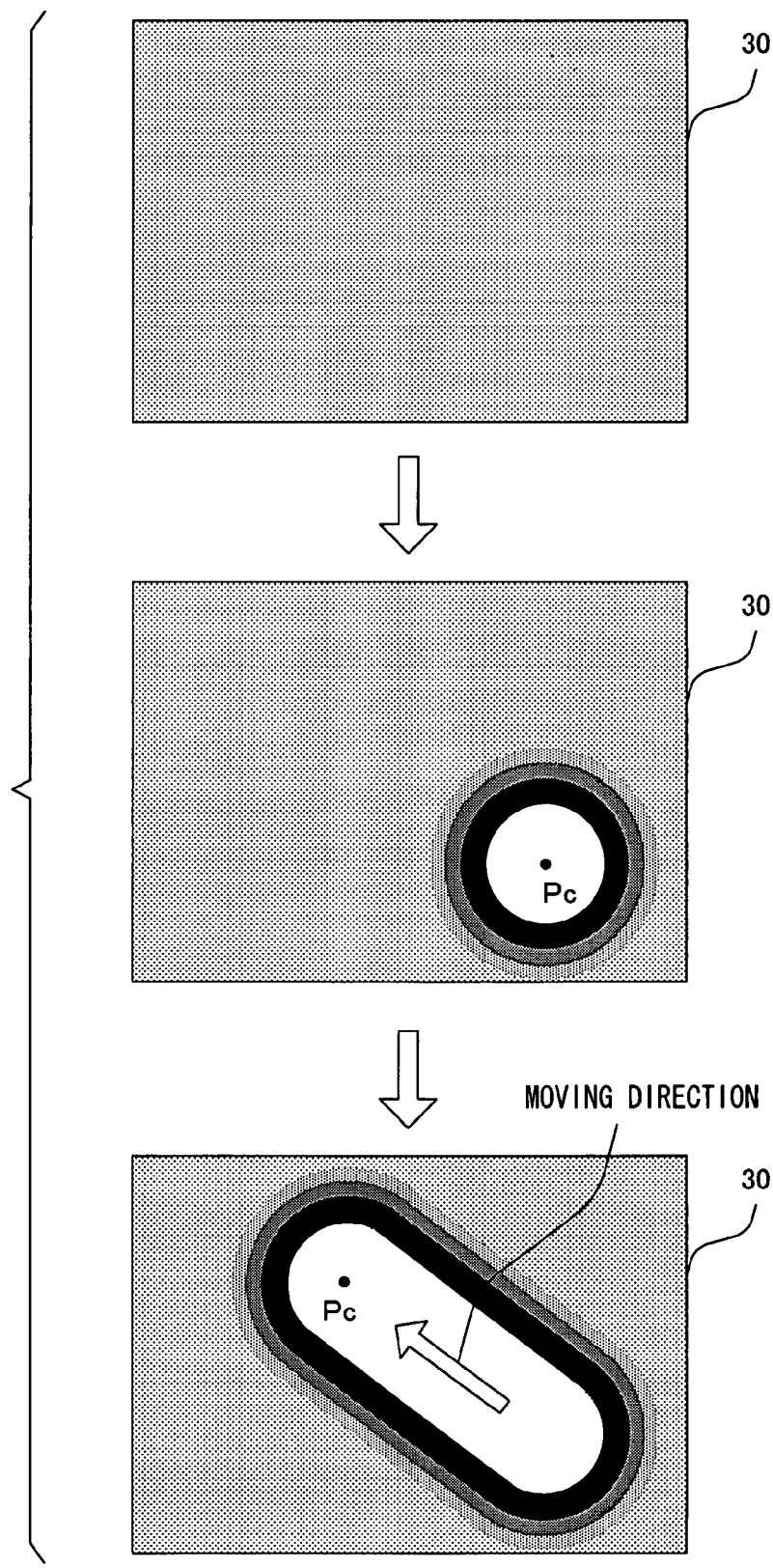
FIG. 20 is a diagram showing an exemplary method of updating the height map 30.
Figure 22:
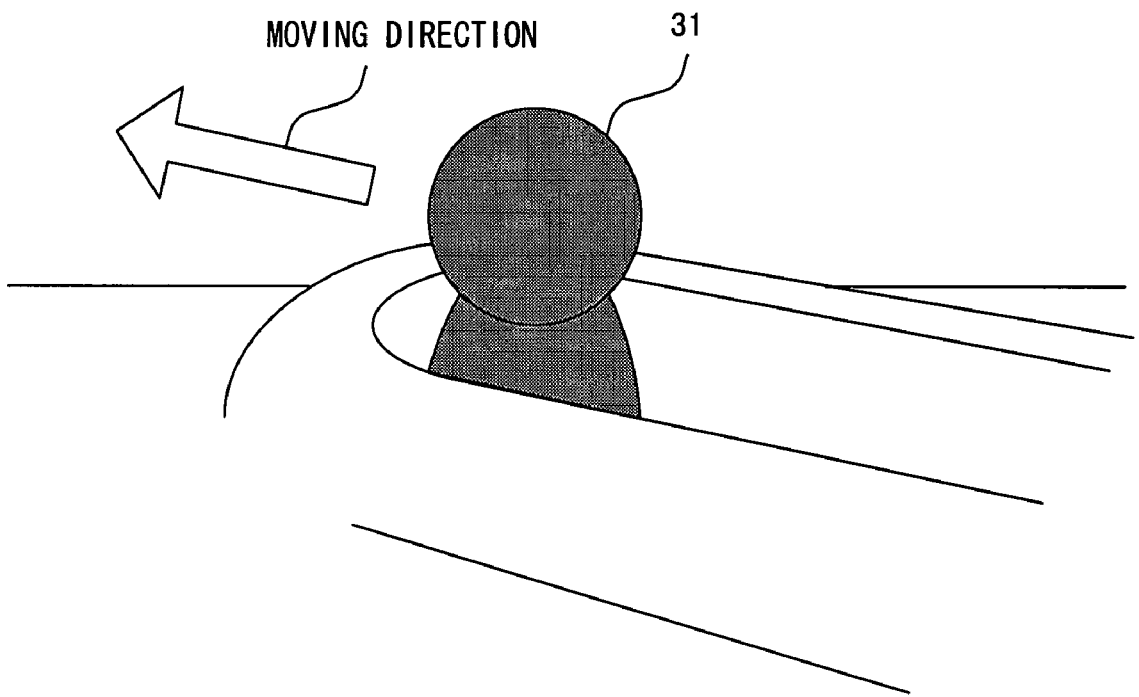
FIG. 22 is an example of an image to be ultimately generated.

Note that in order to pursue a more realistic representation, it is also possible to represent, when the moving object 31 moves while pushing through the accumulation of snow, the removed snow being piled up on the periphery of the moving object 31 (see FIG. 22). In this case, as shown in FIG. 20, each of the height data values of the circular region having a certain radius and having its center at the position Pc is updated to be 0, and simultaneously each of the height data values of a region on the periphery of the circular region is increased to be an appropriate value. Note that in order to pursue an even more realistic representation, it is preferable that the amount of the removed snow and the amount of the piled-up snow are almost equal to each other, and therefore the increasing amount of the height data values of the region on the periphery of the circular region may be determined in a dynamic manner in accordance with the area of the circular region and the decreasing amount of the height data value of each texel of the circular region. Note that when the moving object 31 moves while pushing through the accumulation of snow, it would be unnatural if the snow were piled up behind the moving object 31. Thus, it is preferable that the height data values are updated with the moving direction of the moving object 31 taken into account, such that the snow is piled up only in the front and the side of the moving object 31.

Figure 21:
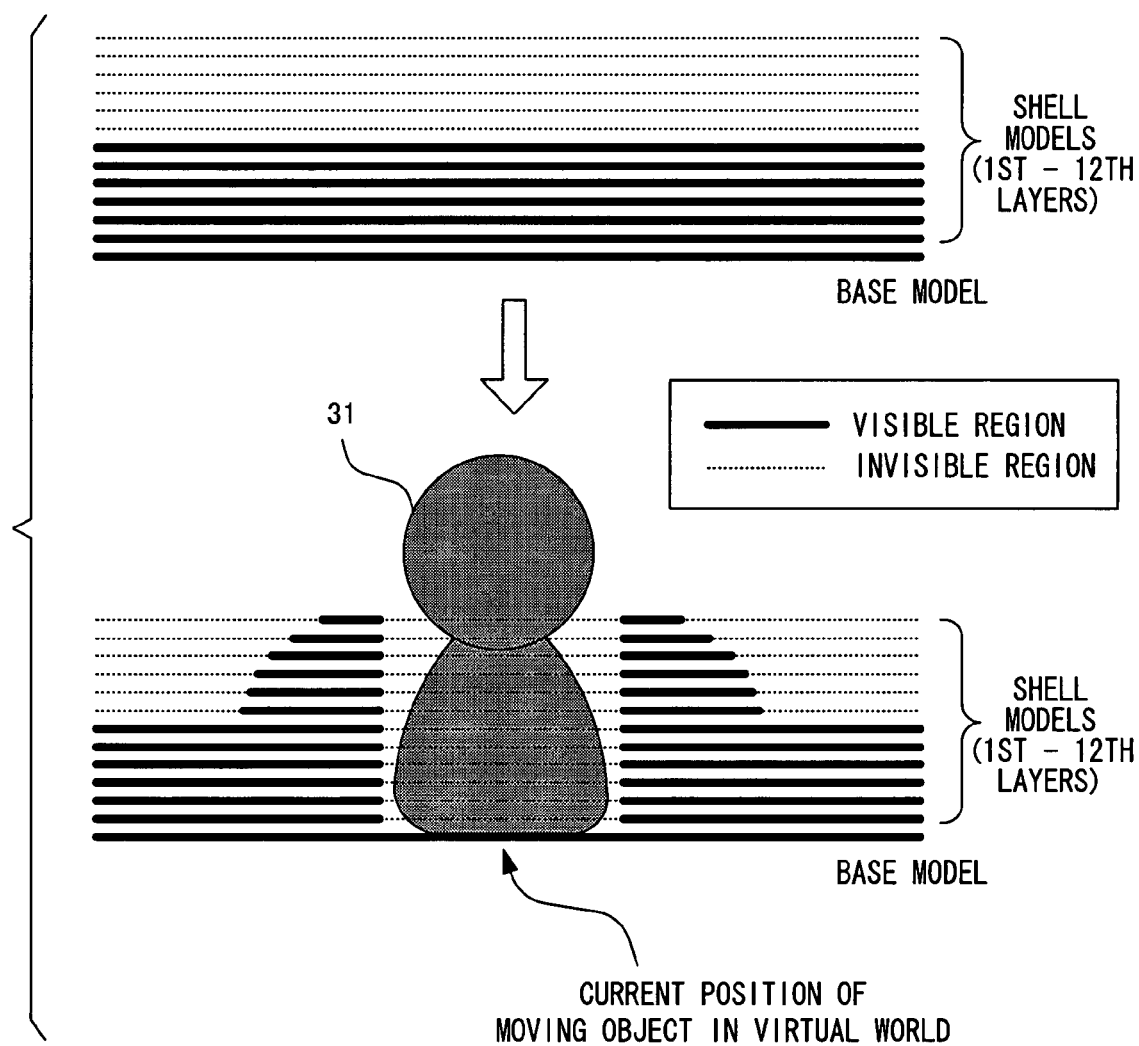
FIG. 21 is a diagram illustrating visible regions of the multilayer shell models changing in accordance with an update of the height map 30.

FIG. 21 is a diagram showing the multilayer shell models used when removed snow is piled up on the periphery of the moving object 31. As shown in FIG. 20, the height data values are updated, whereby each layer of the shell models is to be invisible in the surrounding region (the circular region) of the current position of the moving object 31 and also the higher layers of the shell models are changed from invisible to visible in a peripheral region (the region on the periphery of the circular region) of the circular region. As a result, as shown in FIG. 22, it is displayed that the accumulation of snow is removed from only a region immediately surrounding the moving object 31 and the removed snow is piled up in a region on the periphery of the region immediately surrounding the moving object 31.

Note that the methods of updating the height map as described in FIGS. 17 and 20 can be used not only for representing the moving object 31 moving while pushing through the accumulation of snow, but also for representing, for example, a hole being dug in the ground with a shovel or a portion of bricks being blown away by a bomb.

Note that in the above example, in order to represent the accumulation of snow by the multilayer shell models, the visible regions of each layer of the multilayer shell models are drawn in white (or in high intensity gray). However, the color or the design of the visible regions may be changed in accordance with a three-dimensional object to be drawn. For example, in order to represent soil by the multilayer shell models, a texture image of soil may be applied to the visible regions of the multilayer shell models for the soil to seem more realistic, or strata may be represented by differentiating the colors of the layers.

Figure 23:
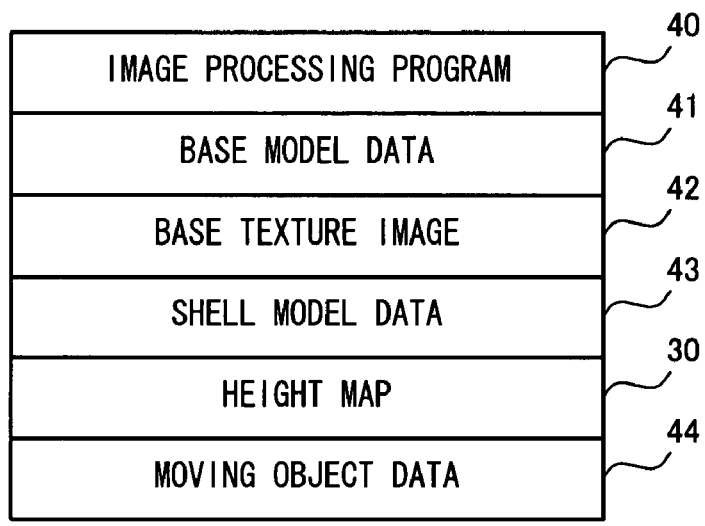
FIG. 23 is a memory map of an external main memory 12.
Figure 24:
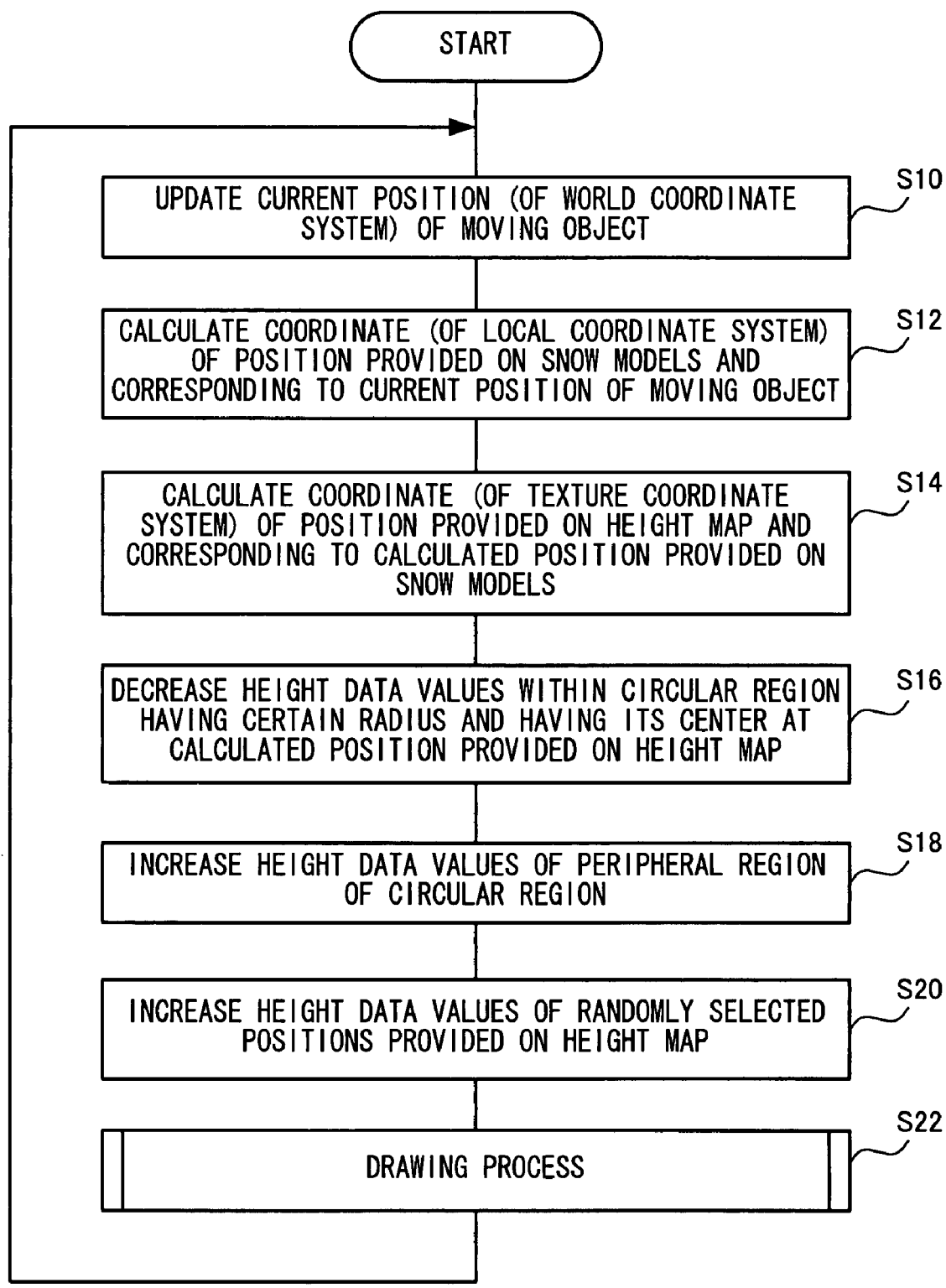
FIG. 24 is a flow chart showing the flow of a process performed based on an image processing program 40.
Figure 25:
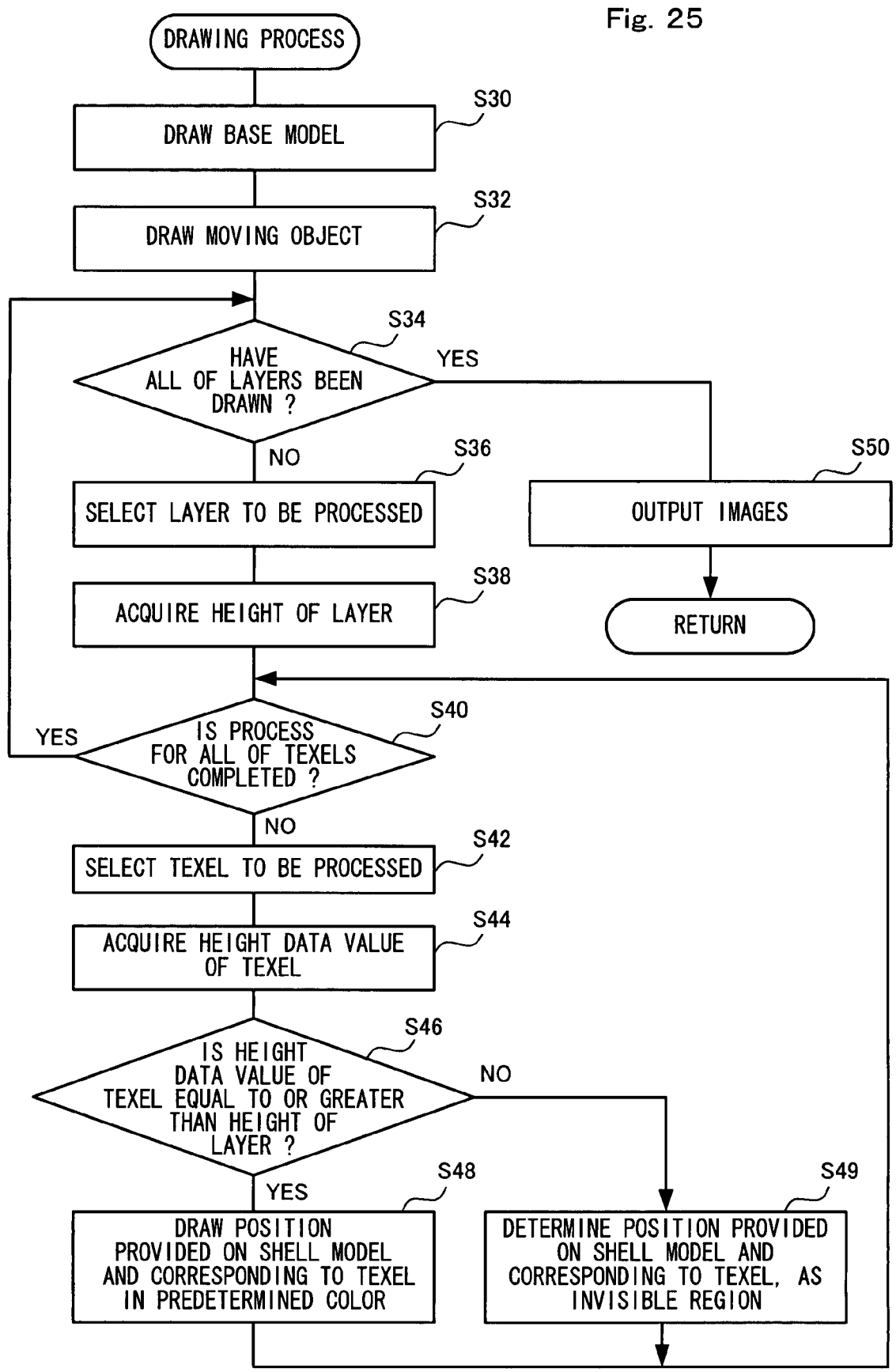
FIG. 25 is a flow chart showing the flow of a drawing process.

With reference to FIGS. 23 through 25, operations of the game apparatus 3 will be described in further detail below.

FIG. 23 is a memory map of the external main memory 12. Note, however, certain data is not shown therein. Note that the internal main memory 11e may be used instead of the external main memory 12. The external main memory 12 stores an image processing program 40, base model data 41, a base texture image 42, shell model data 43, the height map 30, and moving object data 44.

The image processing program 40 is a computer program for causing a computer (the CPU 10 or the GPU 11b) to execute the below-described processes shown in flow charts of FIGS. 24 and 25, and in the present embodiment, is loaded from the optical disc 4 to the external main memory 12. Note, however, that the image processing program 40 may be provided not only by the optical disc 4 but also by another arbitrary external storage medium, may be provided by another computer system via a wired or wireless communication circuit, or may be recorded in advance in a non-volatile storage device, such as the flash memory 17, provided within the game apparatus 3.

The base model data 41 is data for constructing the base model shown in FIG. 8 and includes information such as vertex coordinates and normal vectors of the polygons included therein. The base model data 41 is typically loaded from the optical disc 4 to the external main memory 12.

The base texture image 42 is image data representing a design of the base model, and is typically loaded from the optical disc 4 to the external main memory 12.

The shell model data 43 is data for constructing the multilayer shell models shown in FIG. 8, and in the present embodiment, the CPU 10 or the GPU 11b automatically generates the shell model data 43 based on the base model data 41, so as to store the generated shell model data 43 into the external main memory 12. Note that the shell model data 43 also includes information indicating the height of each layer.

The height map 30 is typically loaded from the optical disc 4 to the external main memory 12, and is then updated as necessary.

The moving object data 44 is data relating to the moving object 31, and includes polygon data, a texture image, current position coordinates, and the like.

Next, with reference to the flow charts of FIGS. 24 and 25, the flows of operations performed based on the image processing program 40 and performed by the CPU 10 and the GPU 11b will be described. Note that a process of each step shown in the flow charts of FIGS. 24 and 25 may be performed by either the CPU 10 or the GPU 11b, and therefore each step may be performed by the more appropriate of the CPU 10 and the GPU 11b. In the following description, described is a case where steps S10 through S20 shown in the flow chart of FIG. 24 are performed by the CPU 10 and each step shown in the flow chart of FIG. 25 is performed by the GPU 11b.

When the execution of the image processing program 40 is started, a series of the process shown in the flow chart of FIG. 24 is started. Note that a process of changing the number of layers of the shell models, changing the height of each layer of the shell models, and the like may be added to the flow chart of FIG. 24 in accordance with user input and other conditions.

In step S10, the CPU 10 updates the current position (of the world coordinate system) of the moving object 31 in accordance with a user's instruction received via the controller 7.

In step S12, the CPU 10 calculates a coordinate (of the local coordinate system) of a position provided on the snow models (the multilayer shell models) and corresponding to the current position (of the world coordinate system) of the moving object 31 (see FIG. 16).

In step S14, the CPU 10 calculates a coordinate (of the texture coordinate system) of a position Pc provided on the height map 30 and corresponding to the coordinate (of the local coordinate system) of the position provided on the snow models and calculated in step S12 (see FIG. 16).

In step S16, the CPU 10 decreases the height data values within a circular region having a certain radius and having its center at the position Pc provided on the height map 30 and calculated in step S14 (see FIG. 20).

In step S18, the CPU 10 increases the height data values of a peripheral region of the circular region (see FIG. 20).

In step S20, the CPU 10 randomly selects positions (texels) provided on the height map 30 and increases the height data values of the selected positions (see FIG. 15). Step S20 is a process for causing snow to gradually accumulate, and therefore is performed when snow is required to accumulate.

When the process of step S20 is completed, a drawing process of step S22 is performed by the GPU 11b. With reference to the flow chart of FIG. 25, the drawing process will be described in detail below.

When the drawing process is started, the GPU 11b first draws the base model. Note that for example, in order to represent soil by the multilayer shell models, it is also possible to represent the soil by treating the base model as one of the multilayer shell models used for representing the soil. In this case, the base model may be considered as one (i.e., the innermost-layer shell model) of the multilayer shell models and the drawing process for the base model may be performed in the same manner as that for the shell models performed in and after step S32.

In step S30, the GPU 11b draws the base model based on the base model data 41 and the base texture image 42. Specifically, the GPU reads the base texture image 42 from the external main memory 12 and texture-maps the base model with the read base texture image 42, so as to draw the texture-mapped base model in a frame memory provided within the VRAM 11d.

In step S32, the GPU 11b draws a moving object based on the moving object data 44.

In steps S34 through S48, the multilayer shell models (the snow models) are drawn in the frame memory provided within the VRAM 11d, in sequential order from the innermost layer.

In step S34, the GPU 11b determines whether or not all of the shell models have been drawing. As a result, the GPU 11b proceeds to step S36 when a shell model yet to be drawn is present, and proceeds to step S50 when all of the shell models have been drawn.

In step S36, the GPU 11b selects, as a process object layer, the innermost-layer (i.e., the closest to the base model) shell model of the shell models yet to be drawn.

In step S38, the GPU 11b acquires the height of the process object layer from the shell model data 43.

In steps S40 through S48, it is determined, by referring to the texels of the height map 30 in order, whether or not each position provided on the process object layer is a visible region. As a result, a process of drawing only visible regions in the frame memory provided within the VRAM 11d is performed.

In step S40, the GPU 11b determines whether or not all of the texels of the height map 30 have been referred to. As a result, the GPU 11b proceeds to step S42 when a texel yet to be referred to is present, and returns to step S34 when all of the texels have been referred to.

In step S42, the GPU 11b selects, as a process object texel, one texel from the texels yet to be referred to.

In step S44, the GPU 11b acquires the height data value of the process object texel from the height map 30.

In step S46, the GPU 11b compares the height data value of the process object texel, which is acquired in step S44, to the height of the process object layer, which is acquired in step S38. As a result, the GPU 11b proceeds to step S48 when the height data value of the process object texel is equal to or greater than the height of the process object layer, and proceeds to step S49 when the height data value of the process object texel is less than the height of the process object layer.

In step S48, the GPU 11b determines, as a visible region, a position provided on the process object layer (shell model) and corresponding to the process object texel, so as to draw, in a predetermined color, the visible region in the frame memory provided within the VRAM 11d. Note, however, that the visible region is not drawn when the position provided on the process object layer is hidden behind the moving object 31 (i.e., the position cannot be seen from a virtual camera). Note that when the visible region is drawn in the frame memory provided within the VRAM 11d, the transparency of the process object layer may be changed in accordance with the height thereof. For example, the transparency may be automatically set such that the further outside (i.e., the farther from the base model) the layer is, the greater the transparency thereof is. Further, not only the transparency but also the color of the process object layer may be changed in accordance with the height thereof.

When the process of step S48 is completed, the GPU 11b returns to step S40.

In step S49, the position provided on the process object layer (shell model) and corresponding to the process object texel is determined as an invisible region, and therefore the GPU 11b returns to step S40 without drawing the position in the frame memory provided within the VRAM 11d.

In step S50, the GPU 11b outputs, to the TV 2, images (e.g., the image shown in FIG. 19) generated as a result of the above steps S30 through S48, when it is determined in step S34 that all of the shell models have been drawn. That is, the GPU 11b outputs, via the AV-IC 15 and the AV connector 16, images drawn in the frame memory provided within the VRAM 11d.

When the process of step S50 is completed, the GPU 11b returns to step S10 of FIG. 24.

The above process of steps S10 through S22 is performed in one frame cycle (e.g., a cycle of 1/60 sec.) in a repeated manner. As a result, a moving image representing a virtual space is displayed on the display screen of the TV 2.

Note that although, in the present embodiment, an example of generating a moving image is described, in other embodiments the drawing process of FIG. 25 may be performed only once in order to generate a still image.

As described above, according to the present embodiment, it is possible to draw a three-dimensional object, such as an accumulation of snow, soil, sand, or bricks, positioned in a virtual space, using the small number of polygons even when the three-dimensional object is complex-shaped, by displaying the object in a simulated manner by multilayer polygonal models, without preparing a polygonal model in shape corresponding to the shape of the object.

Further, it is possible to easily change the shape of a three-dimensional object only by changing the height data values of the height map 30.

While certain example embodiments have been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an image processing program for drawing a three-dimensional object positioned in a virtual space for use on a computing system that includes at least one processor, the image processing program causing the computing system to:
   read, from a storage medium, multilayer polygon data that is associated with the three-dimensional object, the three-dimensional object including a plurality of layers, each of the plurality of layers including polygonal models;
   read, from the storage medium, a height map that includes height data values arranged in a two-dimensional array, the height data values each indicating a height of a position on the three-dimensional object;
   determine a visibility characteristic of a position provided on a layer of the three-dimensional object by comparing a height of the layer of the three-dimensional object to the corresponding height data value of the height map; and
   draw a region in a predetermined color, based on the determined visibility characteristic.

2. The medium according to claim 1, wherein the image processing program further causes the computing system to change the height data values of at least a portion of positions provided on the height map.

3. The computer-readable storage medium according to claim 2, wherein the image processing program further causes the computing system to position, in the virtual space, a moving object;
   animate a movement of the moving object; and
   change the height data value of a position which is provided on the height map and corresponds to a current position of the moving object,
   wherein the moving object is different from the three-dimensional object.

4. The computer-readable storage medium according to claim 3, wherein the image processing program further causes the computing system to:
   obtain a position which is provided on the multilayer polygonal models and corresponds to the current position of the moving object;
   obtain, based on mapping information indicating which position provided on the multilayer polygonal models corresponds to which position provided on the height map, a position which is provided on the height map and corresponds to the position provided on the multilayer polygonal models; and change the height data value of the position provided on the height map.

5. The computer-readable storage medium according to claim 3, wherein the image processing program further causes the computing system to decrease the height data values within a circular region having a predetermined radius and having a center at the position which is provided on the height map and corresponds to the current position of the moving object.

6. The computer-readable storage medium according to claim 5, wherein the image processing program further causes the computing system to increase the height data values of a predetermined region outside the circular region in accordance with a decreasing amount of the decreased height data values.

7. The computer-readable storage medium according to claim 3, wherein the image processing program further causes the computing system to acquire operation data from an input device, and
wherein animation of the movement of the moving object is based on the operation data.

8. The computer-readable storage medium according to claim 2, wherein the image processing program further causes the computing system to randomly select a position provided on the height map and increase the height data value of the position.

9. The computer-readable storage medium according to claim 1, wherein the predetermined color and a predetermined transparency are set in advance for each one of the plurality of layers, and the drawn region is drawn with the predetermined transparency.

10. The computer-readable storage medium according to claim 1, wherein the image processing program further causes the computing system to read a texture image from the storage medium; and
map the texture image to the region based on the determined visibility characteristic, where the region is displayed in a visible manner.

11. The computer-readable storage medium according to claim 1, wherein the image processing program further causes the computing system to generate a base model from base model data read from the storage medium; and
generate the multilayer polygon data on top of a base model.

12. The computer-readable storage medium according to claim 11, wherein the image processing program further causes the computing system to map a texture image prepared for the base model onto the base model.

13. The computer-readable storage medium according to claim 11, wherein the image processing program further causes the computing system to change the number of layers to be generated based on the multilayer polygon data.

14. The computer-readable storage medium according to claim 1, wherein the multilayer polygon data is prepared in advance of being read from the storage medium.

15. The computer-readable storage medium according to claim 14, wherein the image processing program further causes the computing system to:
read base model data;
construct a base model from the base model data, the base model being a model upon which the three-dimensional object is constructed; and
map a texture image that is prepared for the base model onto the base model.

16. An image processing apparatus for drawing a three-dimensional object positioned in a virtual space, the image processing apparatus comprising:
a processing system configured to:
load multilayer polygon data that is configured to construct multilayer polygonal models including a plurality of polygonal models positioned in layers;
load a height map that includes height data values arranged in a two-dimensional array, the height data values each indicating a height of a position which is provided on the three-dimensional object to be drawn and corresponds to a position provided on the multilayer polygonal models;
determine, by comparing a height of a layer of the multilayer polygonal models to the height data value of a position provided on the height map, whether a position provided on the layer and corresponding to the position provided on the height map is to be displayed in a visible manner; and
draw a region in a predetermined color based on the determined visible manner.

17. The image processing apparatus according to claim 16, wherein the processing system is further configured to change the height data values of at least a portion of positions provided on the height map.

18. The image processing apparatus according to claim 17, wherein the processing system is further configured to:
position, in the virtual space, a moving object which is an object different from the three-dimensional object:
move the moving object in the virtual space; and
change the height data value of a position which is provided on the height map and corresponds to a current position of the moving object.

19. A computer implemented method for drawing a three-dimensional object in a virtual space that is rendered by a processing system that includes at least one processor, the method comprising:
rendering, via the at least one processor, the three-dimensional object by rendering a plurality of layered polygonal models that each include one or more polygons, each one of the plurality of layered polygonal models including a region and a corresponding height;
processing a height map that includes a height map value that relates to a height at a position in/on the three-dimensional object;
determining a visibility characteristic of the region of at least one of the plurality of layered polygonal models by comparing the corresponding height to the height map value at the position in/on the three-dimensional object; and
rendering the region based on the determined visibility characteristic.

20. The method of claim 19, further comprising updating the height map value to be a different height map value.

21. The method of claim 20, further comprising:
animating an object at a second position in the virtual space, the object different from the three-dimensional object,
wherein the changing the height map value to the different height map value occurs when the second position of the animated object corresponds to the position in the three-dimensional object that relates to the height map value.

22. The method of claim 19, wherein the region is only rendered when the visibility characteristic is visible as opposed to when the visibility characteristic is invisible.

23. The method of claim 22, further comprising mapping a texture to the region only when the region is rendered and the visibility characteristic is visible.

24. A image processing system for drawing a three-dimensional object in a virtual space, the system comprising:

a computing system that is configured to:
- render the three-dimensional object to a video output by rendering a plurality of layered polygonal models that each include one or more polygons, each one of the plurality of layered polygonal models including a height;
- process a height map that includes a height map value that relates to a height at a position of the three-dimensional object;
- determine a visibility characteristic of a region of at least one of the plurality of layered polygonal models that corresponds to the position of the three-dimensional object by comparing the height of the at least one of the plurality of layered polygonal models to the height map value at the position; and
- render the region based on the determined visibility characteristic.

25. The system of claim 24, wherein the computing system is further configured to update the height map value to be a different height map value.

26. The system of claim 25, wherein the computing system is further configured to:
- animate an object at a second position in the virtual space, the object different from the three-dimensional object, wherein the update of the height map value to the different height map value occurs when the second position of the animated object corresponds to the position in the three-dimensional object that relates to the height map value.

27. The medium of claim 1, wherein the region is only drawn when the visibility characteristic is visible and not drawn when the visibility characteristic is invisible.

28. The medium of claim 27, wherein the image processing program further causes the computing system to map a texture to the region only when the region is drawn and the visibility characteristic is visible.

* * * * *